United States Patent [19]
Dorricott et al.

[11] Patent Number: 5,299,073
[45] Date of Patent: Mar. 29, 1994

[54] VIDEO TAPE RECORDER SPEED CONTROL

[75] Inventors: Martin R. Dorricott, Basingstoke; John W. Richards, Stockbridge, both of United Kingdom

[73] Assignee: Sony United Kingdom Ltd., Staines, United Kingdom

[21] Appl. No.: 751,110

[22] Filed: Aug. 28, 1991

[30] Foreign Application Priority Data

Aug. 31, 1990 [GB] United Kingdom ............... 9018998

[51] Int. Cl.$^5$ .................. G11B 15/52; H04N 5/78; H04N 7/01
[52] U.S. Cl. ............................ 360/73.12; 360/9.1; 348/441
[58] Field of Search ............ 360/73.08, 9.1, 73.12; 358/140

[56] References Cited

U.S. PATENT DOCUMENTS

| | | | |
|---|---|---|---|
| 3,686,469 | 8/1972 | Clark et al. | 328/155 |
| 4,550,349 | 10/1985 | Okuyama et al. | 360/73.08 |
| 4,780,774 | 10/1988 | Edakubo et al. | 360/77 |
| 4,866,520 | 9/1989 | Nomura et al. | 358/140 |

FOREIGN PATENT DOCUMENTS

| | | |
|---|---|---|
| 0091187 | 10/1983 | European Pat. Off. |
| 0176257 | 4/1986 | European Pat. Off. |
| 0205325 | 12/1986 | European Pat. Off. |
| 0210822 | 2/1987 | European Pat. Off. |
| 2181313 | 4/1987 | United Kingdom |

OTHER PUBLICATIONS

IEEE Transactions on Consumer Electronics vol. CE-25, No. 1, Feb. 1979, New York US pp. 45-48 Yukihiko Machida 'Simplified television standards converter as a video tape reproduction system' p. 46, right col., line 14-p. 47, right col., line 8.

*Primary Examiner*—William L. Sikes
*Assistant Examiner*—Trong Phan
*Attorney, Agent, or Firm*—William S. Frommer; Alvin Sinderbrand

[57] ABSTRACT

Video tape recorder speed control apparatus for controlling a video tape recorder (1) to cause it to reproduce a recorded video signal at a predetermined speed, such as a fraction 1/n of the normal speed, the apparatus comprising the video tape recorder (1), first and second counters (25,26), the first and second counters (25, 26) being incremented by a signal locked in frequency to the field repetition frequency of the video signal at the normal playback speed thereof, the first counter (25) resetting periodically at intervals determined by the predetermined speed, the second counter (26) being reset with a signal locked in frequency to the field repetition frequency of the video signal being reproduced by the video tape recorder (1), a comparator (27) for periodically comparing the counts of the first and second counters (25, 26) thereby to derive a phase error signal, and a control signal generator (28, 29, 30) to derive in dependence on the phase error signal a signal to control the reproduction speed of the video tape recorder (1).

22 Claims, 18 Drawing Sheets

VIDEO TAPE RECORDER SPEED CONTROL

BACKGROUND OF THE INVENTION

1. Field of the Invention

This invention relates to methods of and apparatus for video tape recorder speed control, and in particular to methods of and apparatus for controlling a video tape recorder to reproduce at less than the normal playback speed. Such methods and apparatus have application, but not exclusive application, in the conversion of video signals to photographic film images.

2. Description of the Prior Art

Video tape recorders (VTRS) are available which can reproduce a recorded video signal at less than the normal playback speed. One example of such a machine is the Sony Corporation high definition (HD) digital VTR type HDD 1000. However, this digital VTR, in common with other such machines, has the limitation that reproduction at less than the normal playback speed is possible only at a number of preset fractions of the normal playback speed. This is inconvenient where the need arises for constant and stable reproduction at a speed different from the preset speeds available.

SUMMARY OF THE INVENTION

One object of the present invention is to provide a method of controlling the reproduction speed of a video tape recorder which overcomes these problems.

Another object of the present invention is to provide improved video tape recorder speed control apparatus.

Another object of the present invention is to provide video tape recorder speed control apparatus for stably controlling reproduction at a speed less than the normal playback speed.

According to the present invention there is provided a method of controlling the reproduction speed of a video tape recorder to cause it to reproduce a recorded video signal at a predetermined speed, the method comprising:

incrementing first and second counters with a signal locked in frequency to the field repetition frequency of said video signal at the normal playback speed of said video signal;

periodically resetting said first counter at intervals determined by said predetermined speed;

periodically resetting said second counter with a signal locked in frequency to the field repetition frequency of said video signal being reproduced by said video tape recorder;

comparing the counts of said first and second counters, thereby to derive a phase error signal; and controlling the reproduction speed of said video tape recorder in dependence on said phase error signal.

According to the present invention there is also provided video tape recorder speed control apparatus for controlling a video tape recorder to cause it to reproduce a recorded video signal at a predetermined speed, the apparatus comprising:

a video tape recorder;

first and second counters;

means to increment said first and second counters with a signal locked in frequency to the field repetition frequency of said video signal at the normal playback speed of said video signal;

means to reset said first counter periodically at intervals determined by said predetermined speed;

means to reset said second counter with a signal locked in frequency to the field repetition frequency of said video signal reproduced by said video tape recorder;

a comparator for periodically comparing the counts of said first and second counters, thereby to derive a phase error signal: and means to control the reproduction speed of said video tape recorder in dependence on said phase error signal.

According to the present invention there is also provided video tape recorder speed control apparatus for controlling a video tape recorder to cause it to reproduce a recorded video signal at a predetermined speed, the apparatus comprising:

a video tape recorder;

counter means;

means to increment said counter means with a signal locked in frequency to the required line frequency of said video signal;

means to reset said counter means with a signal locked in frequency to the field repetition frequency of said video signal reproduced by said video tape recorder;

means to derive a phase error signal in dependence on said field repetition frequency signal and the output of said counter means; and means to control the reproduction speed of said video tape recorder in dependence on said phase error signal.

The above, and other objects, features and advantages of this invention will be apparent from the following detailed description of illustrative embodiments which is to be read in connection with the accompanying drawings.

DESCRIPTION OF THE PREFERRED EMBODIMENTS

The three embodiments of VTR speed control apparatus to be described are used as part of apparatus for video signal to photographic film conversion, but it is to be understood that the invention is not limited to such applications, and that embodiments of the invention can be used in a large range of equipments where it is required to control a VTR to reproduce at a constant and stable speed, generally less than the normal playback speed, for example, for supply to video signal processing apparatus at less than real time speed.

The conversion apparatus for video signal to photographic film conversion to be described is particularly intended for use in the conversion of a high definition video signal (HDVS) having 1125 lines per frame, 60 fields per second, to 24 frames per second 35 mm film. However, it will be understood that the conversion apparatus can readily be adapted to effect conversion from other input video signals.

Figure 1:
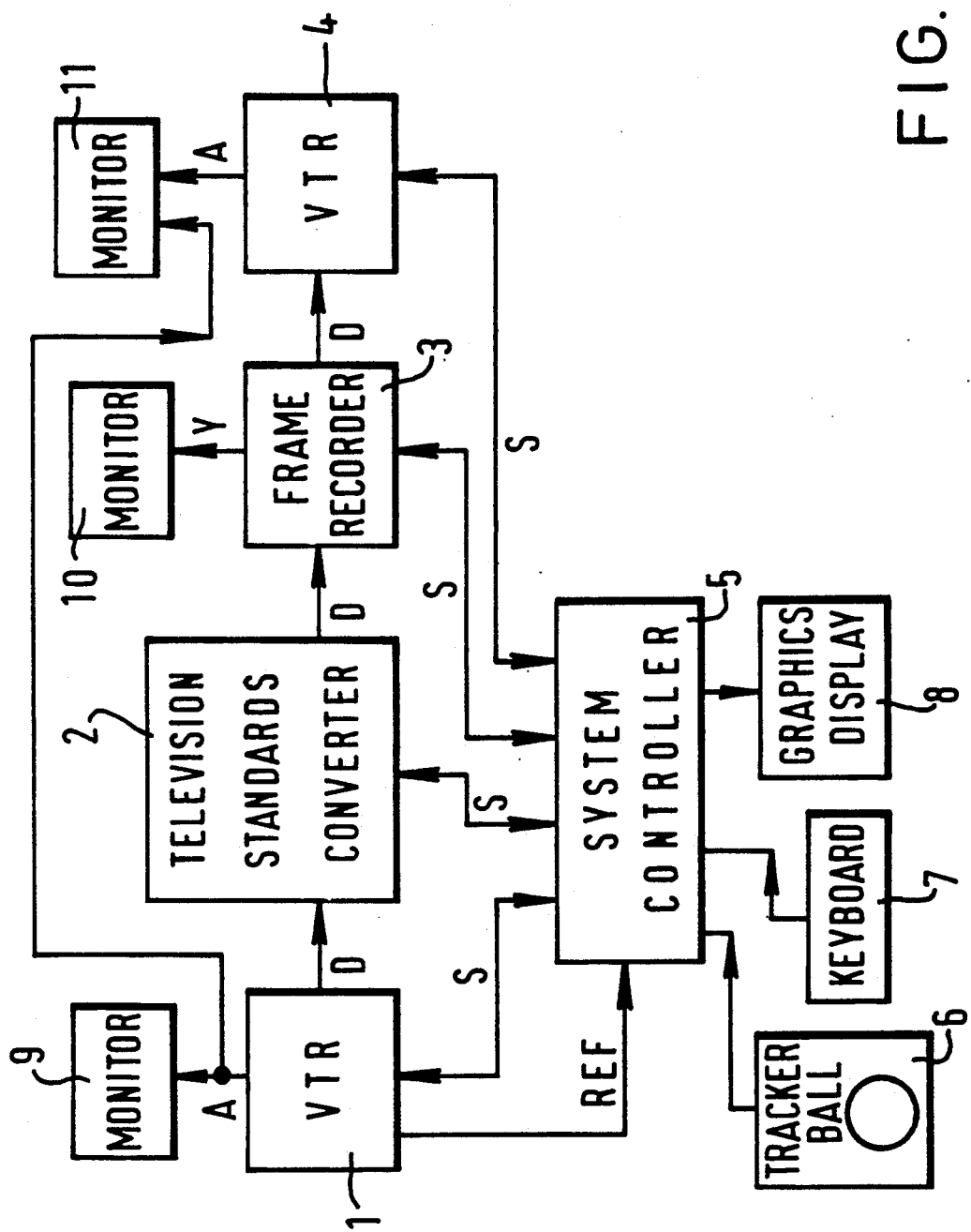
FIGS. 1 and 2 are block diagrams of respective parts of a conversion apparatus for video signal to photographic film conversion which incorporates an embodiment of the present invention.
Figure 2:
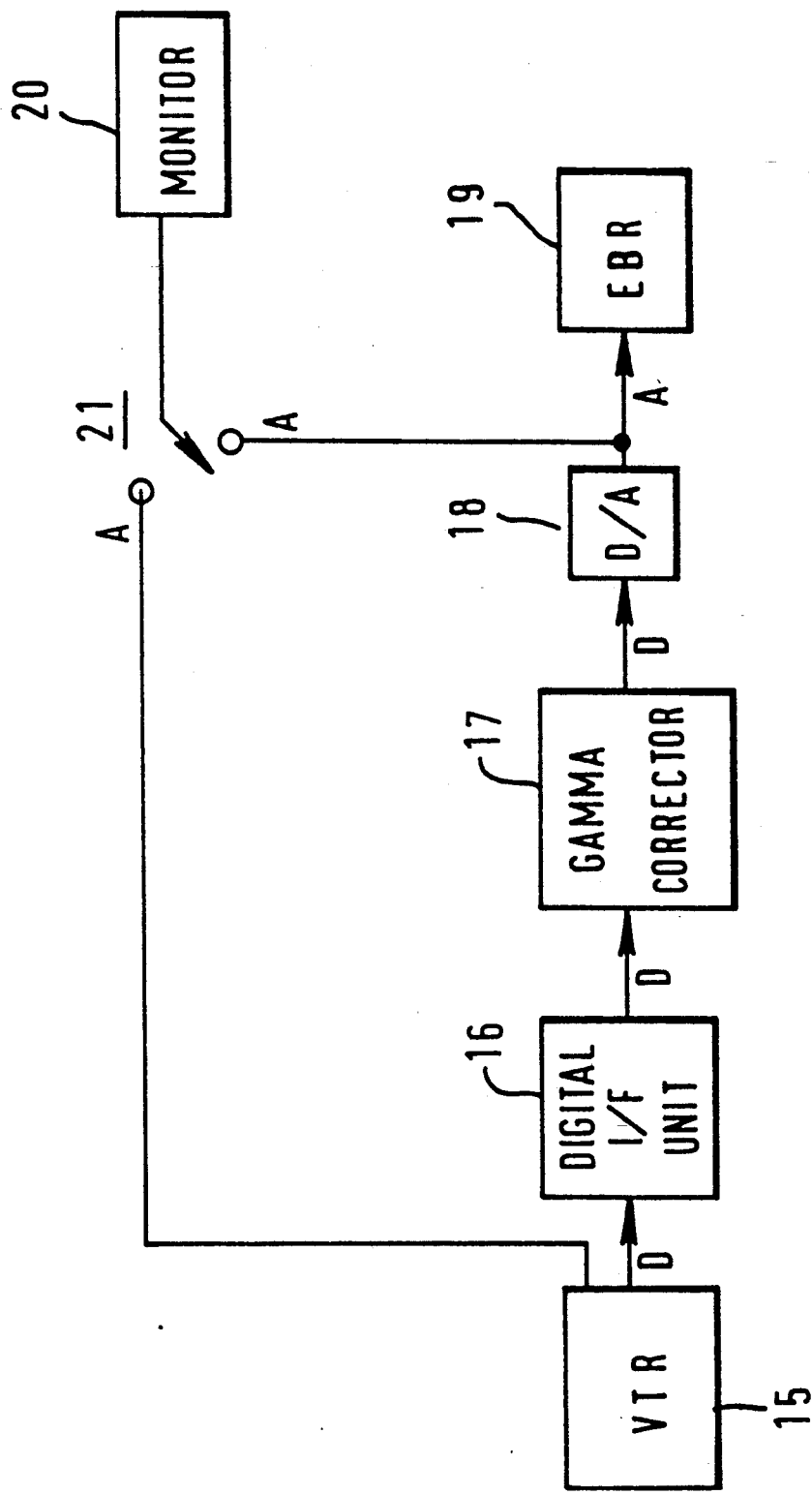

The conversion apparatus can conveniently be considered in two parts; the first part, shown in FIG. 1, effects the conversion of the input HDVS to a progressive scan digital video signal corresponding to 24 frames per second which is recorded on a VTR; and the second part, shown in FIG. 2, reproduces the recorded video signal and transfers it to photographic film.

The part of the apparatus shown in FIG. 1 comprises a high definition digital VTR 1, a television standards converter 2, a frame recorder 3, a second high definition digital VTR 4, a system controller 5 having associated with it a tracker ball control 6, a keyboard 7 and a graphics display 8, and television monitors 9, 10 and 11, interconnected as shown, and operating as will be described below.

The digital VTRs 1 and 4 can be Sony Corporation digital VTRs type HDD 1000, and the frame recorder 3 can be a Sony Corporation frame recorder type HDDF 500. The system controller 5 can be an IBM compatible personal computer, and the standards converter 2 is of nonstandard form so is described in detail below. The other elements of the apparatus are standard items, and it is noted that the television monitor 10 can conveniently be a black and white monitor.

The second part of the apparatus, shown in FIG. 2, comprises a high definition digital VTR 15, a digital interface (I/F) unit 16, a gamma corrector 17, a digital-to-analog converter 18, an electron beam recorder 19, a television monitor 20 and a switch 21, interconnected as shown, and operating as will be described below.

Referring again to FIG. 1, the video signal connections marked D are digital connections, that is carrying Y, U/V signals including video sync signals; the video signal connections marked A are analog connections carrying Y, U, V signals; the connections marked S are serial connections (RS422); the video signal connection marked Y is an analog connection carrying the Y signal only; and the connection marked REP carries the reference video sync signals (a complete set excluding only picture information) derived from the digital VTR 1 and having a field frequency of 60 Hz. In other embodiments, the digital VTR1 may have a different field frequency, in which case the reference video sync signal REF has that frequency. Alternatively, the whole apparatus may be locked to an external sync generator.

The input video signal which is to be transferred to film, and which may have been derived from a high definition video camera, is recorded on a magnetic tape reproduced by the digital VTR 1. The digital VTR 1 is controlled as will be described below to reproduce the recorded video signal at ¼ of the normal playback speed, as this is a convenient speed of operation for the subsequence circuitry, and in particular the standards converter 2. The elements 1 to 4, 9, 10 and 11 are under control of the system controller 5, the system controller 5 being in turn controllable by inputs from the tracker ball control 6 and the keyboard 7, and having associated with it the graphics display 8 on which is displayed information relating to the progress of the conversion.

A portion of the input HDVS is reproduced from the digital VTR 1 and supplied to the standards converter 2. This operates, as described in detail below, to derive from the input video signal, which is a 60 fields per second interlace scanned video signal, firstly, a motion adapted progressive scan digital video signal at 60 frames per second, and then from this a motion compensated progressive scan digital video signal corresponding to 24 frames per second, but not necessarily at that rate. This video signal is recorded by the frame recorder 3, for subsequent recording by the digital VTR 4. Thus the operation is intermittent. Such intermittent operation is generally required for video signal to film conversion, because of the need to check at frequent intervals that the conversion is proceeding satisfactorily. Thus depending on the content of the video signal to be converted, adjustment of the parameters, in particular those of the standards converter 2, may need to be made, and the results evaluated before proceeding. The monitors 9 to 11 are provided as further means for checking the video signal at respective points in the conversion apparatus.

In the second part of the conversion apparatus, shown in FIG. 2, the motion compensated progressive scan digital video signal recorded by the digital VTR 4 (FIG. 1) is reproduced by the digital VTR 15 and passed by way of the digital I/F unit 16 to the gamma corrector 17, the purpose of which is to match the gamma characteristics of the video signal to the gamma characteristics of the film being used. The separated operation permitted by the recording of the motion compensated progressive scan digital video signal by the digital VTR 4 (FIG. 1), for subsequent reproduction by the digital VTR 15, enables the gamma correction to be set accurately by the gamma corrector 17. The gamma corrected digital video signal is then converted to an analog signal by the digital-to-analog converter 18 and supplied to the electron beam recorder 19 to be recorded on photographic film. This recording may, for example, be in the form of three monochrome frames for each frame of the video signal, the three frames corresponding respectively to red, green and blue. The further television monitor 20 can be selectively connected by way of the switch 21 to the output of the digital VTR 15 or to the output of the digital-to-analog converter 18, or alternatively of course two separate television monitors can be provided.

The characteristics of the conversion apparatus are such that it produces sharp, clear pictures with good motion portrayal on the film, and in particular it produces pictures without motion blur and without introducing any additional judder components. The separated operation permitted by the recording of the motion compensated progressive scan digital video signal on the digital VTR 4 (FIG. 1) permits easy and frequent checking of the parameters of the conversion apparatus, to ensure the quality of the pictures obtained on the film. Iterative operation is perfectly possible, so that the results can rapidly be evaluated and conversion repeated with any flaws corrected by adjustment of the parameters. To obtain higher speed operation, it is of course possible for the first part of the conversion apparatus, that is the part shown in FIG. 1 to be replicated a number of times, to provide additional inputs to the digital VTR 15, so permitting a more intensive use of the part of the apparatus shown in FIG. 2, and hence a higher overall conversion speed.

Referring to FIG. 1, the first embodiment of VTR speed control apparatus which controls the digital VTR 1 to reproduce at $\frac{1}{8}$ of the normal playback speed, and which is comprised in the suitably programmed system controller 5, or alternatively may be embodied in other hardware, will now be described. Basically the speed control apparatus operates by relaxing the speed constraint of the digital VTR 1. This is done by putting it into a closed loop control system, and sampling the video output within a given window. The speed control apparatus also synchronizes the elements downstream from the digital VTR 1. Thus the system controller 5 monitors and adjusts the playback speed of the digital VTR 1 to be $\frac{1}{8}$ of the normal playback speed, via the RS422 link, so that the digital VTR 1 and the standards converter 2 are locked, and the system is locked to the reference video sync signal REF.

To implement the slow motion, the digital VTR 1 repeatedly reproduces fields (or in an alternative embodiment it could be frames) of the recorded video signal, such that the output still conforms to the video transmission standard, except that the average number of new frames per second is $\frac{1}{8}$ of the normal playback number. One of the fields in each group of repeated fields is then grabbed by the television standards converter 2. Since all the fields in each group of repeated fields are identical, it is permissible to grab any one of them.

Figure 3:
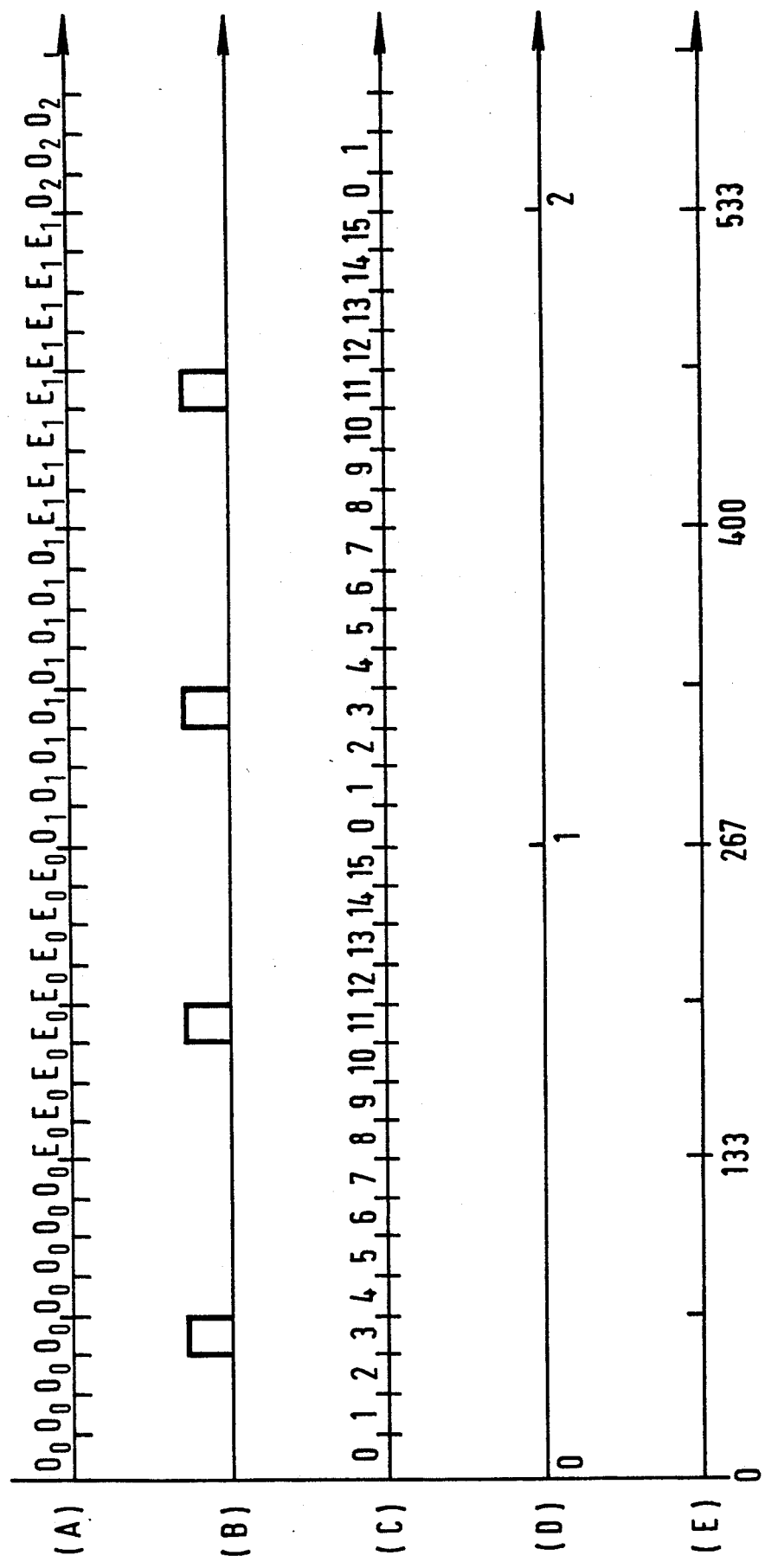
FIG. 3 shown time charts for describing speed control of a VTR.

FIG. 3(A) shows the output of the digital VTR 1 (FIG. 1) at $\frac{1}{8}$ of the normal playback speed, these being sixteen fields corresponding to each frame of the recorded source material. $O_n$ represents the video signal originating from the odd field of source material frame n, and $E_n$ represents the video signal originating from the even field of source material frame n. If the digital VTR 1 (FIG. 1) plays slightly too fast, occasionally there will be less than sixteen fields per frame. Similarly, if it plays slightly too slowly, occasionally there will be more than sixteen fields per frame. FIG. 3(B) shows the ideal sampling positions used to grab the required video signal, these positions being at the third and eleventh fields in the frame. FIG. 3(C) shows the output value of a reference counter referred to below in connection with FIG. 4. FIG. 3(D) shows the corresponding source material frame numbers, and FIG. 3(E) shows the corresponding times in milliseconds.

Figure 4:
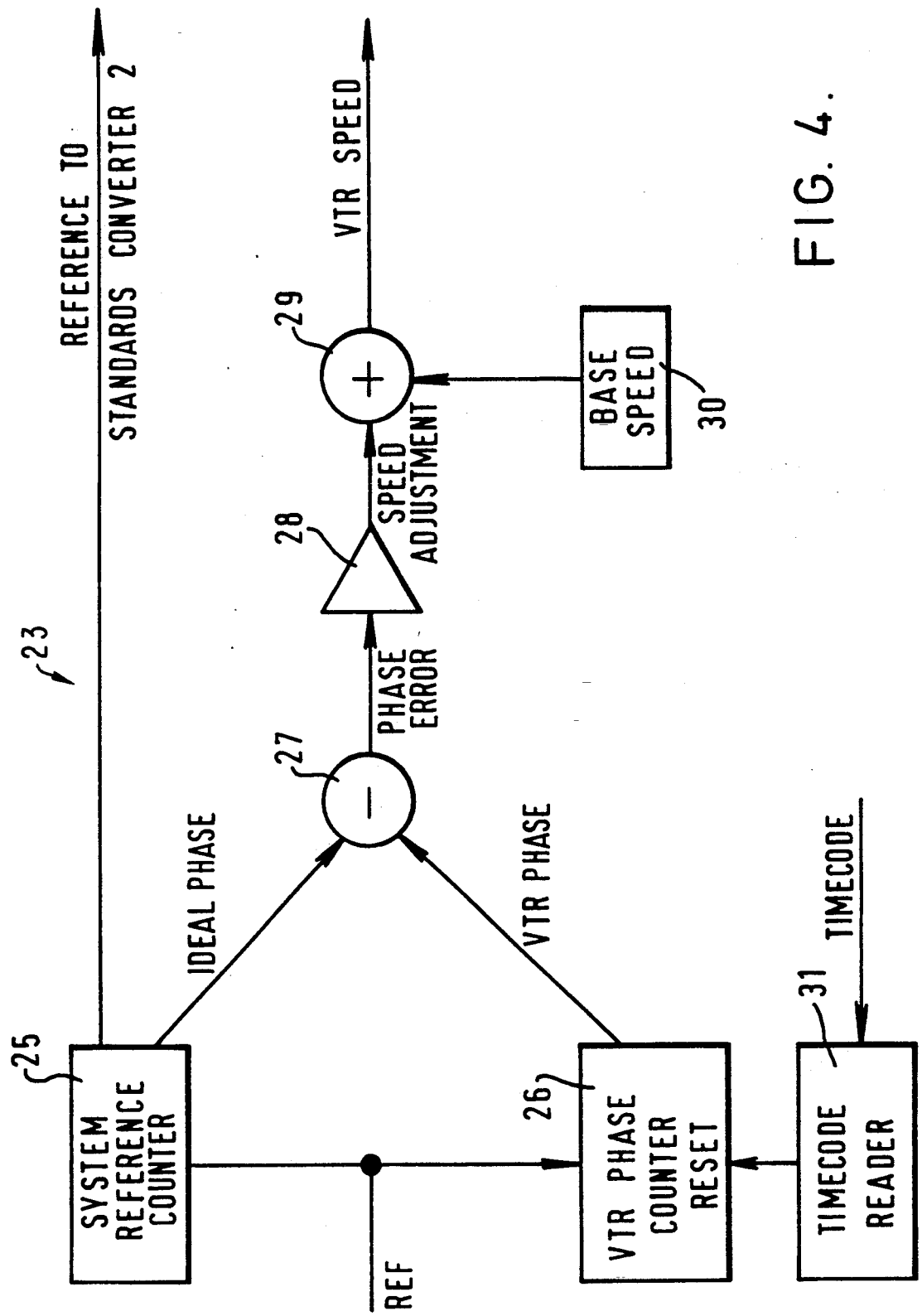
FIG. 4 is a block diagram of a first embodiment of VTR speed control apparatus according to the present invention.
Figure 5:
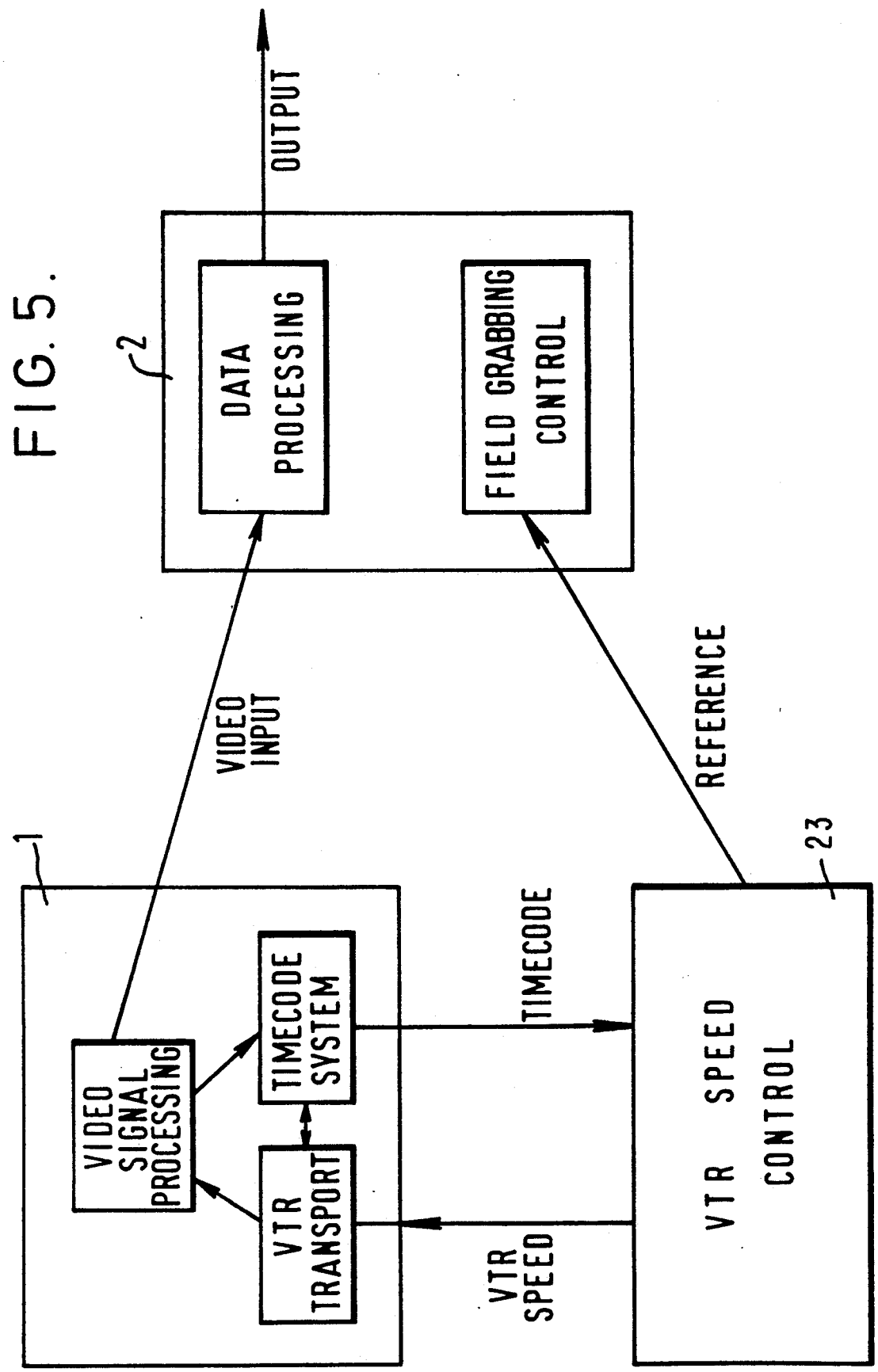
FIG. 5 is a block diagram showing part of the first embodiment in more detail.

Reference will now be made to FIGS. 4 and 5. FIG. 4 shows a speed control apparatus 23 for the digital VTR 1 (FIG. 1) in block form, and FIG. 5 relates the speed control apparatus functionally to elements in the part of the conversion apparatus shown in FIG. 1.

The speed control apparatus 23 comprises counters 25 and 26, a subtracter 27, an amplifier 28, an adder 29, a base speed control 30 and a timecode reader 31 interconnected as shown, and operating as will now be described.

The counter 25 is a system reference counter which increments modulo-16 at field rate intervals (FIGS. 3(C)) under control of the reference video sync signal REF, which is also supplied to the counter 26 which is a VTR phase counter. The system reference counter 25 substitutes as an ideal VTR running at precisely $\frac{1}{8}$ of the normal playback speed. When the system reference counter 25 is between counts of 0 and 7, the ideal VTR would supply odd fields, and when it is between counts of 8 and 15, the ideal VTR would supply even fields. Thus the count value represents the phase of the video signal with respect to the cycle of repeating fields. The standards converter 2 receives a pulse reference signal from the system reference counter 25 such that it is synchronized with the system reference counter 25 and it grabs the odd and even fields when the count thereof is 3 and 11 respectively (FIG. 2(B)).

Feedback is provided to lock the digital VTR 1 to the system reference counter 25. This is done by synthesizing the phase of the digital VTR 1 by the VTR phase counter 26 which increments at the field rate in response to the reference video sync signal REF, and is reset to zero in response to the video timecode which changes frame by frame, and which is read by the timecode reader 31. The subtracter 27 thus receives a count signal from the system reference counter 25 representing the ideal phase, and a count signal from the VTR phase counter 26 representing the actual phase of the digital VTR 1. By subtracting one count from the other, the subtracter 27 derives a phase error signal which after amplification by the amplifier 28 which sets the loop gain, forms a VTR speed adjustment signal. The subtraction is done modulo −8, so that the phase error is kept in the range −7 to +8 fields. Thus, for example, an error of 15 fields is converted to −1 field. The VTR speed adjustment signal is supplied to the adder 29 where it is added to a signal from the base speed control 30 to derive a new VTR speed signal for supply to the transport system of the digital VTR 1. Since both of the counters 25 and 26 count with the same clock (the reference video sync signal REF), the phase error can only change when they reset, and therefore the new VTR speed signal need only be sent at these times. So long as the phase error between the system reference counter 25 and the digital VTR 1 is maintained at less than four fields, the standards converter 2 will always sample or grab the correct field, as if the digital VTR 1 were running at a true $\frac{1}{8}$ of the normal playback speed.

If the timecode supplied from the digital VTR 1 to the timecode reader 31 is read from a longitudinal track on the tape, then there may be errors in reading the timecode from the tape at low speeds of the tape relative to the timecode reading head. Such difficulties do not arise when the timecode is recorded with the video signal in oblique tracks on the tape.

Figure 6:
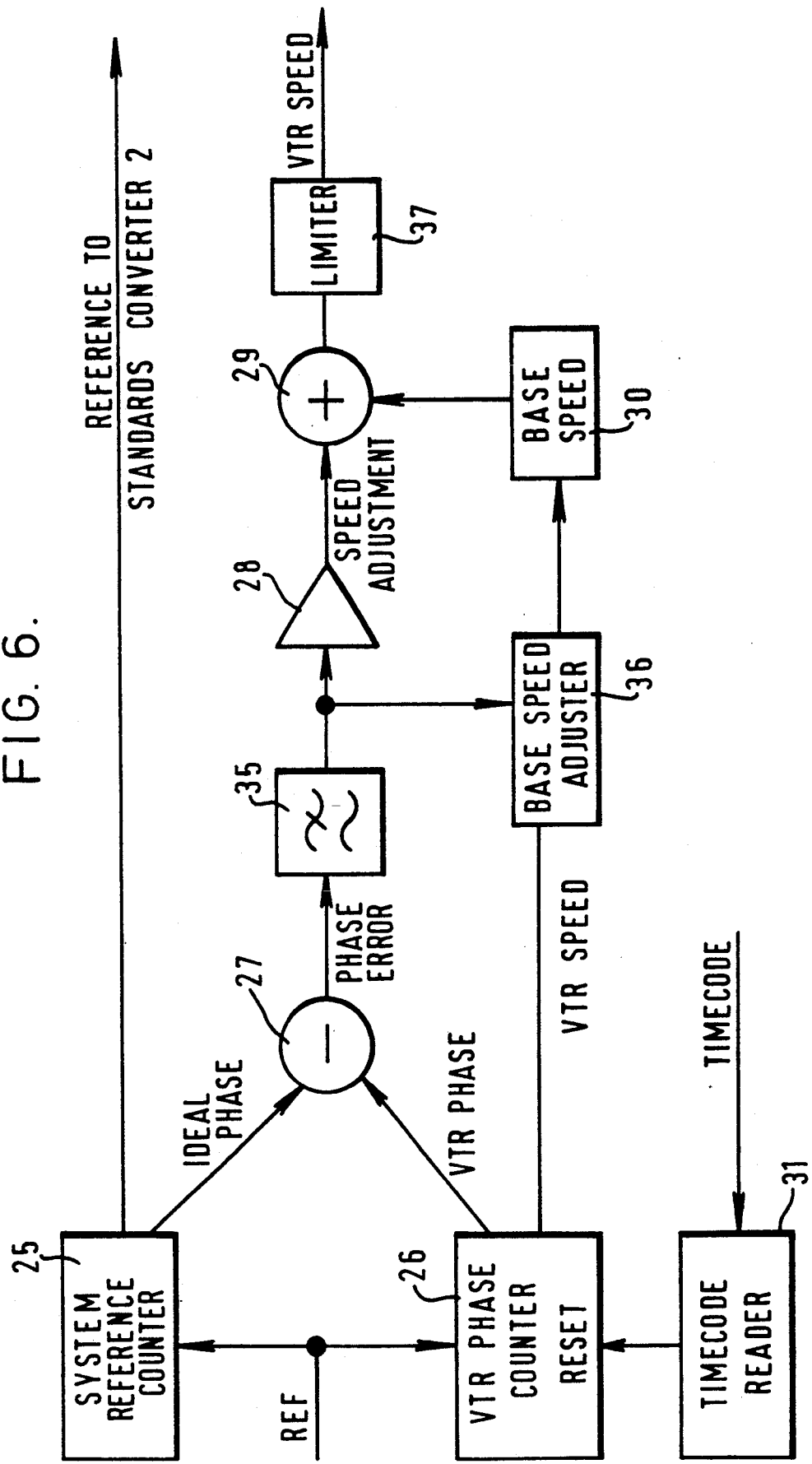
FIG. 6 is a block diagram of a second embodiment of VTR speed control apparatus according to the present invention.

FIG. 6 shows a second embodiment of a VTR speed control apparatus which overcomes such problems associated with errors in reading the timecode. This second embodiment differs from the first embodiment shown in FIG. 4, in that it additionally includes a filter 35, a base speed adjuster 36 and a limiter 37, connected as shown.

The filter 35 is a 2-tap low-pass filter which counteracts anomalies in the timecode. Whilst the first embodiment ensures that the phase error between the system reference counter 25 and the VTR phase counter 26 remains approximately constant, there is the problem that if this error is close to +8 or −7 fields then the lock becomes unstable, as these are the maximum possible representable phase errors. It would therefore be preferable to lock to a phase error of zero, and in the second embodiment the base speed adjuster 36 operates to adjust the base speed of the digital VTR 1 such that the phase error tends to zero. The base speed adjuster 36 monitors the speed of the digital VTR 1 by recording the count of the VTR phase counter 26 just before it is reset. The base speed of the digital VTR 1 is then only changed in the direction that given sixteen repeat fields per frame. This ensures that the control is stable, and also increases the capture range of the system.

The limiter 37 is optional, but may be included to prevent excessive speed commands being sent, as may occur if there is a system failure.

In other respects the form and operation of the second embodiment of VTR speed control apparatus are the same as those of the first embodiment.

The third embodiment of VTR speed control apparatus comprises a counter which counts line sync pulses derived from the connection REF from the VTR 1 (FIG. 1), and is periodically reset by a control track pulse which is derived from a longitudinal track on the tape being reproduced and has the field repetition rate. The control track pulses are also supplied to a VTR phase error store in which the phase error is accumulated, and which supplies an output to control the VTR speed. As in the second embodiment, the speed control output may be supplied by way of a limiter to prevent excessive speed commands being sent.

Feedback is provided by supplying the outputs of the counter and of the VTR phase error store to an adder, the output of which is supplied to one input of a subtracter, to the other input of which is supplied a signal representing the expected inter-field phase change. The output of the subtracter is supplied to another input of the VTR phase error store.

Various modifications are of course possible. Thus the ⅛ speed is more generally 1/n of the normal playback speed where n is preferably an integer equal to two or more. Also, the invention is readily applicable to cases where frames are repeated instead of the fields which are repeated in the above-described embodiments.

Figure 7:
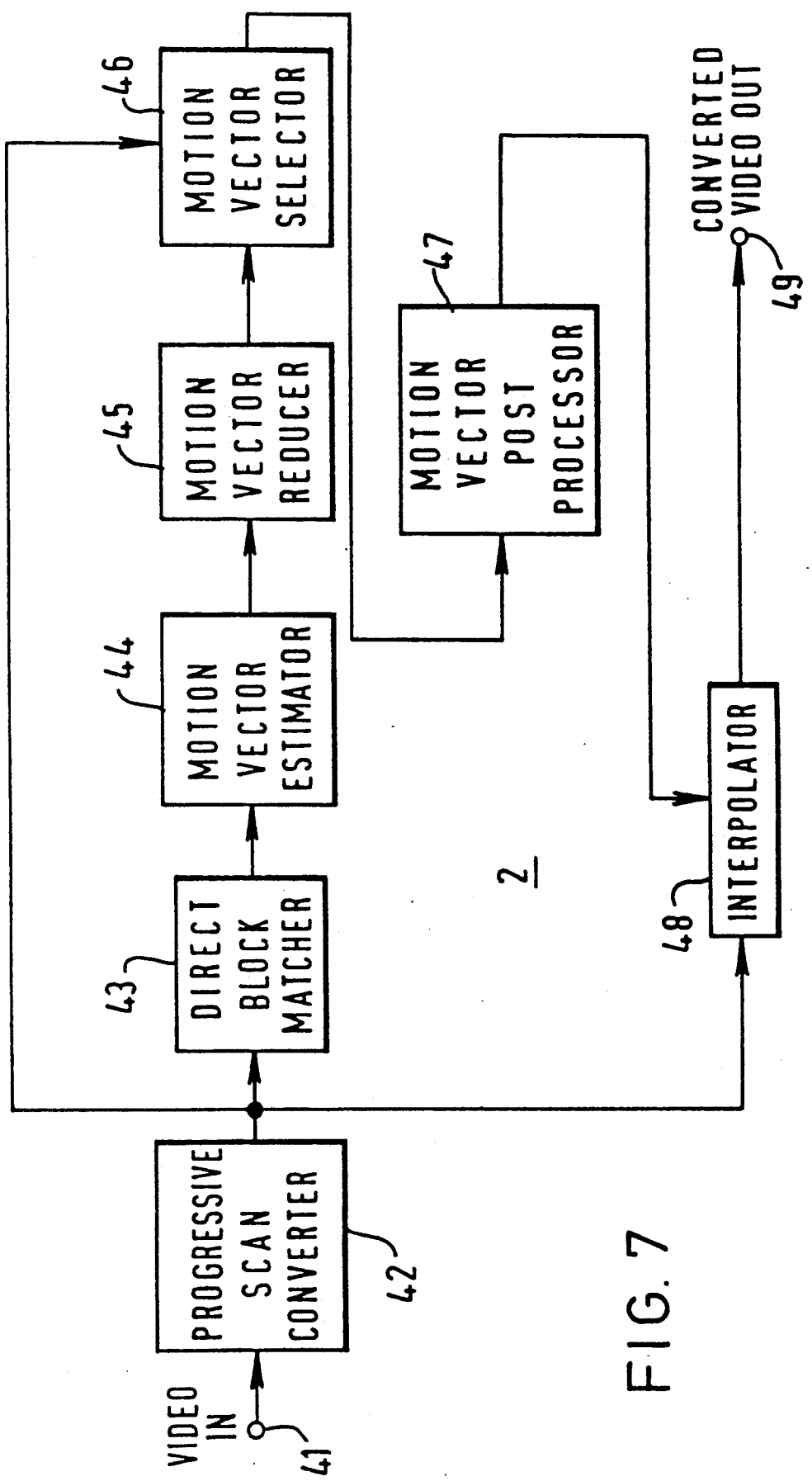
FIG. 7 is a more detailed block diagram of part of the conversion apparatus.

FIG. 7 is a block diagram of the television standards converter 2 (FIG. 1) which will now be described in more detail. The standards converter 2 comprises an input terminal 41 to which the grabbed input video signal is supplied. The input terminal 41 is connected to a progressive scan converter 42 in which the input video fields are converted into video frames which are supplied to a direct block matcher 43 wherein correlation surfaces are created. These correlation surfaces are analyzed by a motion vector estimator 44, which derives and supplies motion vectors to a motion vector reducer 45, wherein the number of motion vectors for each pixel is reduced, before they are supplied to a motion vector selector 46, which also receives an output from the progressive scan converter 42. Any irregularity in the selection of the motion vectors by the motion vector selector 46 is removed by a motion vector post processor 47, from which the processed motion vectors are supplied to and control an interpolator 48 which also receives an input from the progressive scan converter 42. The output of the interpolator 48, which is a standards-converted and motion-compensated video signal is supplied to an output terminal 49. Each part of the standards converter 2 and the operation thereof will be described in more detail below.

Figure 8:
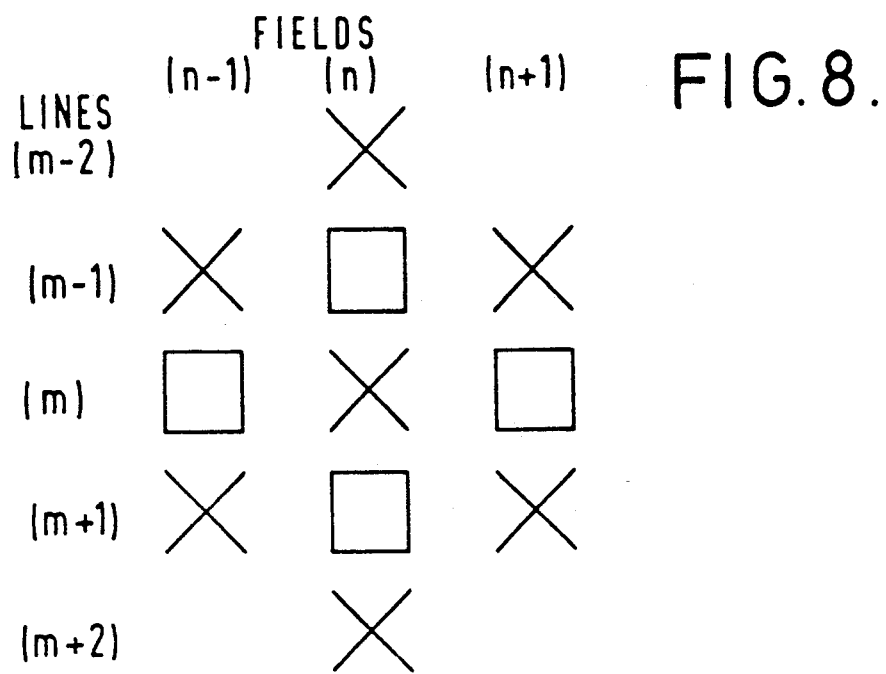
FIG. 8 shows diagrammatically progressive scan conversion.

The progressive scan converter 42 produces output frames at the same rate as the input fields. Thus, referring to FIG. 8 which shows a sequence of consecutive lines in a sequence of consecutive fields, the crosses representing lines present in the input fields and the squares representing interpolated lines, each output frame will contain twice the number of lines as an input field, the lines alternating between lines from the input video signal and lines which have been interpolated by one of the methods to be described below. The interpolated lines can be regarded as an interpolated field of the opposite polarity to the input field, but in the same temporal position.

Progressive scan conversion is preferably carried out, for two main reasons; firstly, to make the following direct block matching process easier, and secondly in consideration of the final output video format.

Concerning direct block matching, this is used to obtain an accurate estimation of the horizontal and vertical motion between two successive video fields, as described in more detail below. However, if an interlaced video signal is used for direct block matching, problems can arise.

Concerning consideration of the final output video format, in the case of the present apparatus, the converted video is supplied via tape to an electron beam recorder, and needs to consist of frames corresponding to the motion picture film rate of 24 frames per second. For this reason, therefore, the production of progressive scan converted frames is necessary, and moreover the progressive scan converted frames can also be used as a fall-back in the case where motion compensated standards conversion is deemed to be producing unacceptable results, for example, where the motion is too diverse to be analyzed satisfactorily or at a scene change. In that case the use of the nearest progressive scan converted frame as the required output frame can produce reasonably acceptable results.

Figure 9:
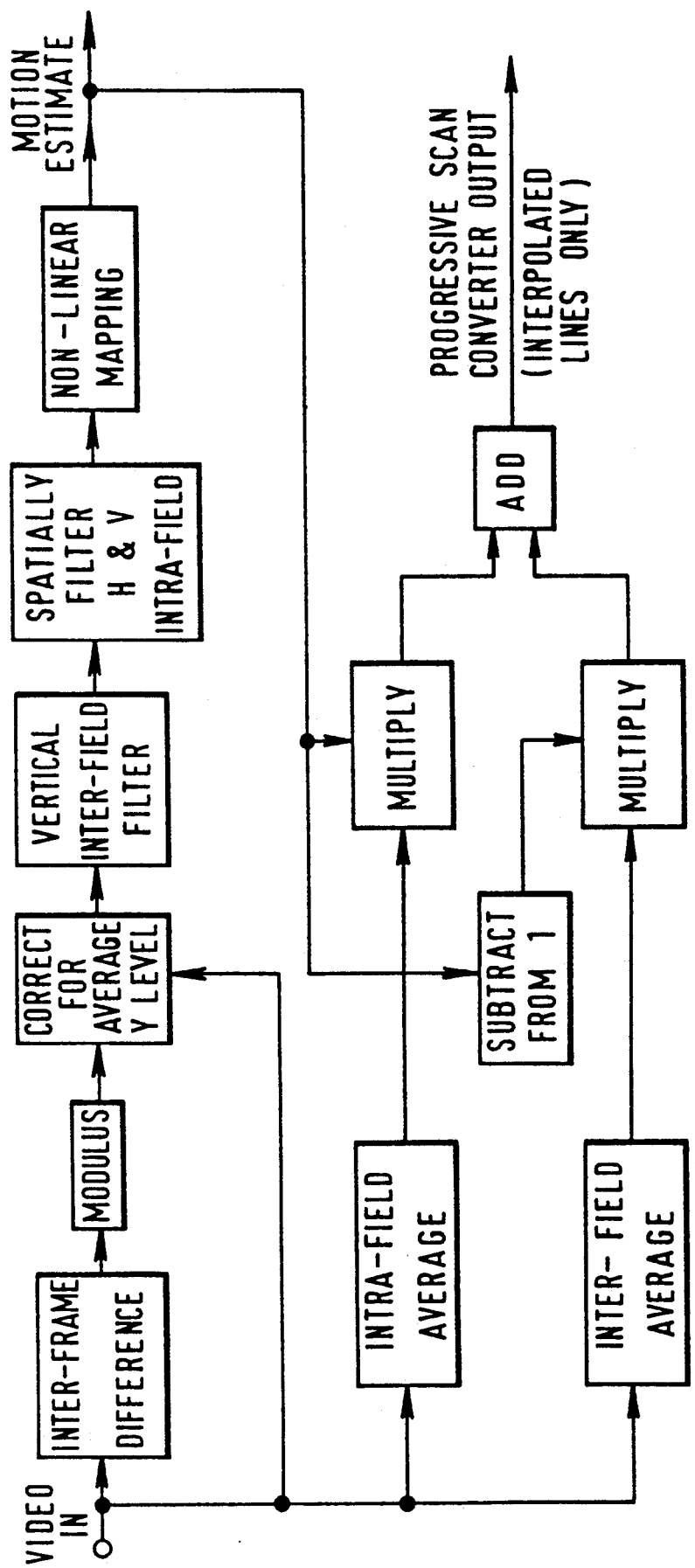
FIG. 9 is a block diagram showing the steps in motion adaptive progressive scan conversion.

Progressive scan conversion can be carried out in a number of ways, such as by previous field replacement, median filtering in which three spatially consecutive lines are examined (temporally these three lines will come from two consecutive fields), or a motion compensated technique which utilizes multi-gradient motion detection followed by multi-direction linear interpolation. However, in the present embodiment the preferred method is motion adaptive progressive scan conversion, the steps of which are indicated in the block diagram of FIG. 9. One of ordinary skill in the art would appreciate and understand how FIG. 9 operates. The concept is to use inter-field interpolation in wholly static picture areas to retain as much vertical information as possible, and to use intra-field interpolation when significant motion is present. This also aids smooth portrayal of motion. In scenes where the motion is somewhere between these two extremes, an estimate of the local motion present in the picture is made, and this is then used to mix together different proportions of inter- and intra-field interpolation.

Referring back to FIG. 7, the frames of video derived by the progressive scan converter 42 are used to derive motion vectors. The estimation of motion vectors consists of two steps. Firstly, correlation surfaces are generated by correlating search blocks from consecutive frames. Then, having obtained these correlation surfaces, they have to be examined to determine the position or positions at which correlation is best. Several different methods of obtaining a correlation surface exist, and in the present case the method used in direct block matching.

The direct block matcher 43 operates as follows. Two blocks, respectively comprising a rectangular array of pixels from consecutive frames of the progressive scan converted video signal are correlated to produce a correlation surface from which a motion vector is derived.

Figure 10:
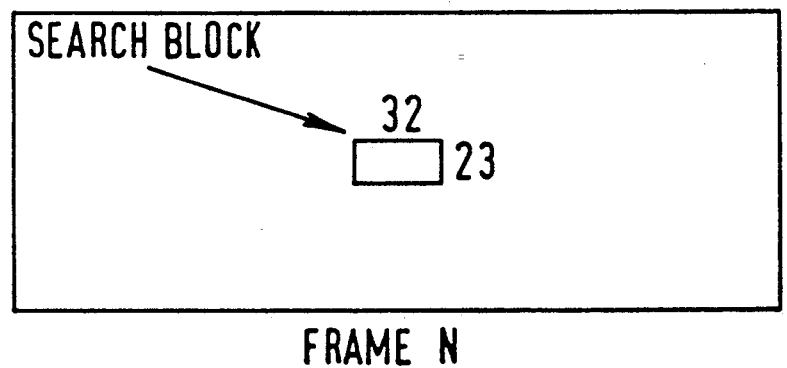
FIG. 10 and 11 show diagrammatically search blocks and search areas, and the relationships therebetween.
Figure 10:
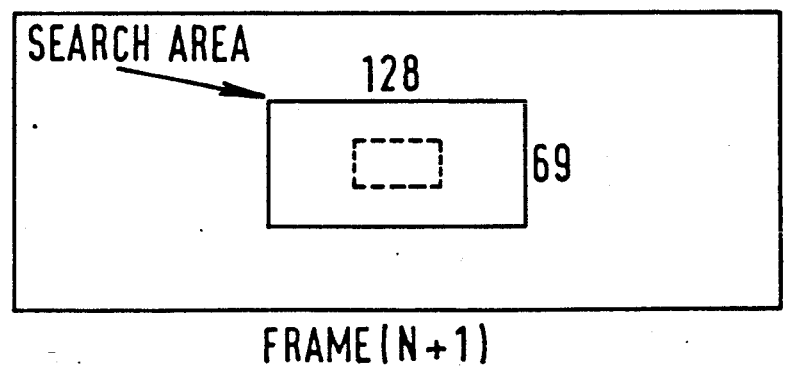
Figure 11:
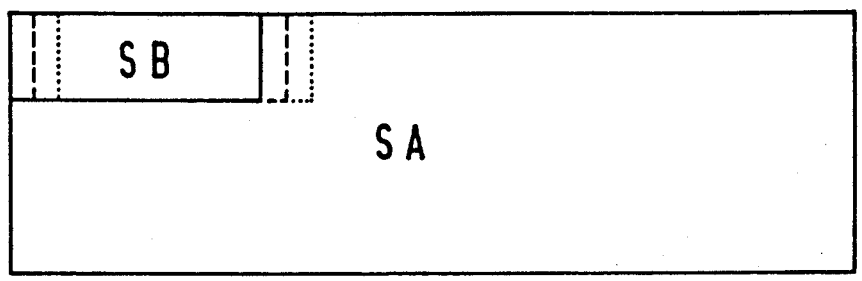
Figure 12:
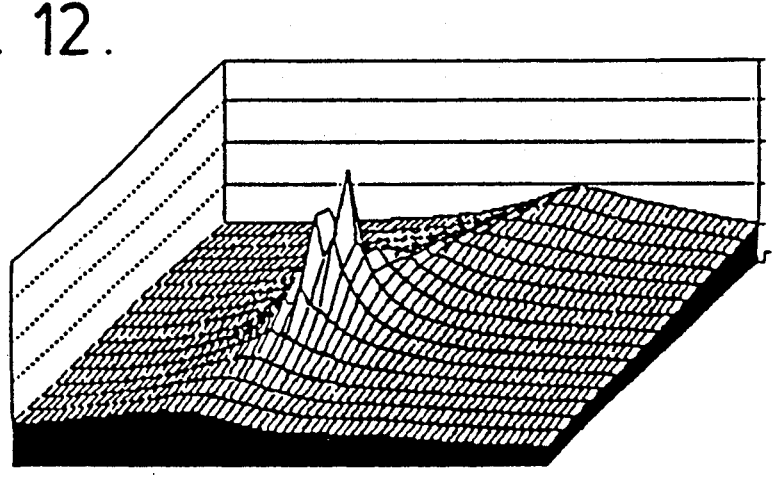
FIG. 12 shows a correlation surface.

Referring to FIG. 10, firstly a small block called a search block of size 32 pixels by 23 lines is taken from a frame as shown in FIG. 10. Then a larger block called a search area of size 128 pixels by 69 lines is taken from the next frame. The search block (SB) is then placed in each possible position in the search area (SA) as shown in FIG. 11, and for each location the sum of the absolute difference of pixel luminance levels between the two blocks is calculated. This value is then used as the height of the correlation surface at the point at which it was derived. It can then be used in conjunction with other similarly derived values for each possible location of the search block in the search area to obtain a correlation surface, an example of which is shown in FIG. 12. For clarity the surface is shown inverted, and as it is in fact the minimum that is required, the required point in FIG. 12 is the main peak.

The size of the search block is selected by examining the minimum size of an object that may require motion compensation. For PAL 625 lines per frame, 50 fields per second signals a search block of 16 pixels by 8 lines has been found suitable for tracking a small object without allowing any surrounding information not within the object, but still within the search block, to affect the tracking of the object. This approach has therefore been adopted in the present apparatus, but modified to take account of the different numbers of active pixels per line, active lines per frame, and aspect ratio of a HDVS as compared with PAL 625/50. The comparative figures, the HDVS being put first, are as follows; 1920 (720) active pixels per line, 1035 (575) active lines per frame, 3:5.33 (3:4) aspect ratio.

It should be added that there is an argument for using a larger search block, since this means that a large object can be tracked. On the other hand, there exists an argument for using a smaller search block, to prevent a small object being over-shadowed by the effect of a large object or background area. Also, however, there is the advantage that with small search blocks there is no requirement for the derivation of more than one motion vector from each of them. Because having a single motion vector is so much easier than having more than one, the present apparatus starts with a small search block as described above, and then causes the search block to grow into a bigger search block if no satisfactory result has been obtained. This then encompasses the advantages of both a small and a large search block. The criteria for a satisfactory result is set by the motion vector estimator 44 (FIG. 7) referred to in more detail below and which determines the motion vector from a given correlation surface.

This technique of causing the search block to grow is not only advantageous for tracking large objects. It can also help to track the movement of an object having the shape of a regular pattern of a periodic nature.

The search block and the search area, can both be grown horizontally vertically, or indeed in both directions, if the correlation surface suggests it.

From the correlation surface (FIG. 12) generated for each search block in a frame the motion vector estimator 44 (FIG. 7) deduces the likely inter-frame motion between the search block and its corresponding search area. It should again be mentioned that for clarity all diagrams of correlation surfaces are shown inverted, that is, such that a minimum is shown as a peak.

The motion vector estimator 44 (FIG. 7) uses motion vector estimation algorithms to detect the minimum point on each correlation surface. This represents the point of maximum correlation between the search block and the search area, and hence indicates the probable motion between them. The displacement of this minimum on the correlation surface with respect to the origin, in this case the centre of the surface, is a direct measurement, in terms of pixels per frame, of the motion. For the simplest case, where the correlation surface contains a single, distinct minimum, the detection of the minimum point on the correlation surface is sufficient to determine accurately the motion between the search block and the search area. As previously mentioned, the use of small search blocks improves the detection of motion and the accuracy of motion estimation, but unfortunately small single search blocks are unable to detect motion in a number of circumstances which will now be described.

Figure 13:
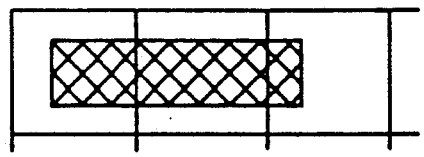
FIG. 13 shows diagrammatically a moving object straddling three search blocks.
Figure 13:
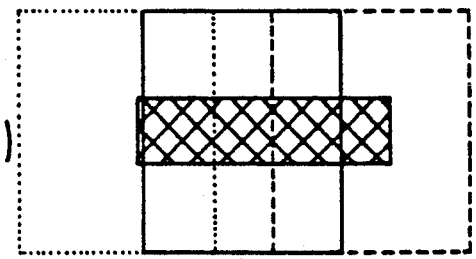
Figure 14:
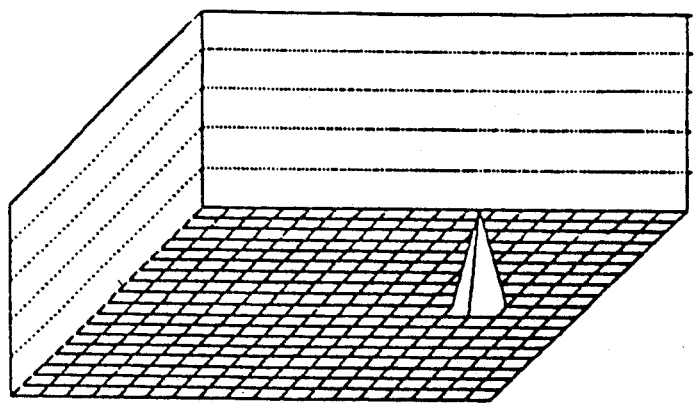
FIGS. 14 to 16 show three resulting correlation surfaces, respectively.
Figure 15:
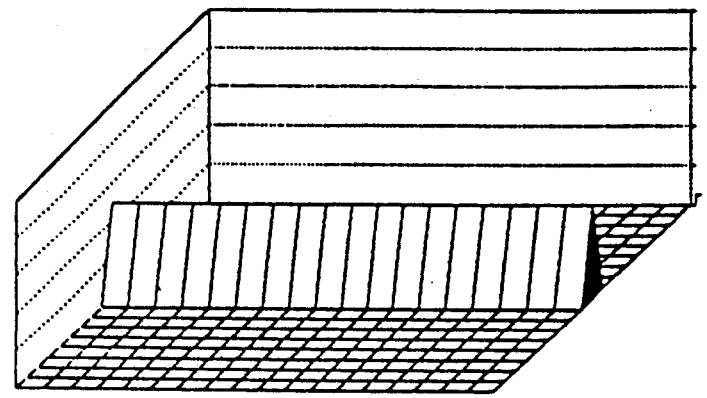

FIG. 13 shows an object with motion vectors (5, 0) straddling three search blocks 1A, 2A and 3A in a frame (t). When the search blocks 1A and 3A are correlated with respective search areas (1B and 3B) in the next frame (t+1) a correlation surface shown in FIG. 14 results showing a minimum at (5, 0). (This assumes a noiseless video source.) However, when the search block 2A is correlated with its respective search area 2B, the correlation surface shown in FIG. 15 is produced, in which the search block 2A correlates with the search area 2B at every point in the y-axis direction. There is therefore no single minimum in the correlation surface, and hence the motion between the search block 2A and the search area 2B cannot be determined.

Figure 16:
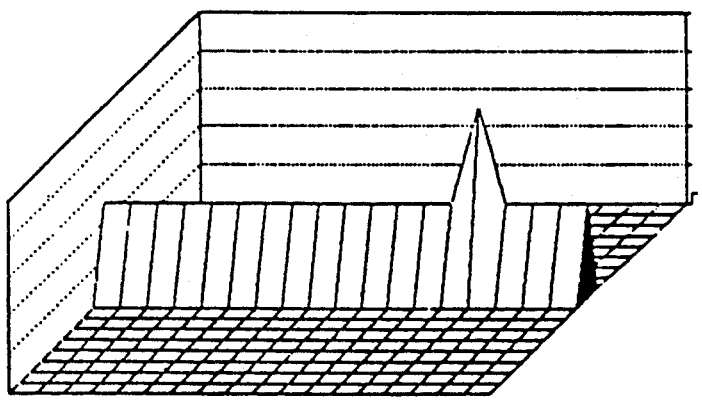

However, now consider the situation if the search block 2A is grown such that it encompasses all three of the original search blocks 1A, 2A and 3A. When the grown search block 2A is correlated with a search area covering the original search areas 1B, 2B and 3B, the resulting correlation surface is as shown in FIG. 16. This shows a single minimum at (5, 0) indicating the correct motion of the original search block 2A. This example illustrates the need for some unique feature in the source video, in order accurately to detect motion. Thus, the search blocks 1A and 3A both had unique vertical and horizontal features, that is the edges of the object, and hence motion could be determined. In contrast, the search block 2A had a unique vertical feature, but no unique horizontal feature, and hence horizontal motion could not be determined. However, by growing the search block until it encompasses a unique feature both horizontally and vertically, the complete motion for that search block can be determined. Moreover, it can be shown that growing the search block is beneficial when noise in the source video is considered.

Figure 17:
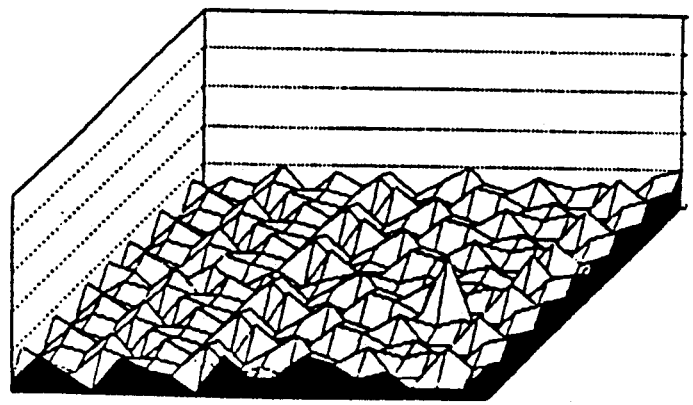
FIGS. 17 and 18 show further examples of correlation surfaces, used in describing a threshold test.
Figure 18:
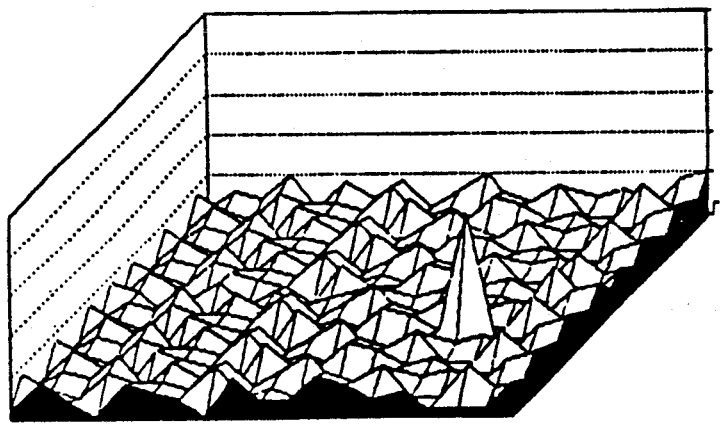

A further example will now be considered with reference to FIG. 17. This shows a correlation surface for a search block where the motion vector is (5, 3). However, due to the numerous other correlations which have taken place between the search block and the search area, the true motion is difficult to detect. An example of source video which might produce such a correlation surface would be a low contrast tree moving with the wind. It is now assumed that the search block and the search area are grown. The growing can take place in the horizontal direction, as in the previous example, or in the vertical direction, or in both directions. Assuming that the neighbouring search blocks have the same motion, the mean effect on the resulting correlation surface will be to increase the magnitude of the minima at (5, 3) by a greater proportion than the magnitude of the other correlation peaks. This is shown in FIG. 18, which indicates that it is then easier to detect the correct motion vector.

The way in which search blocks are grown will now be further considered with reference to FIG. 13. Here it was required to grow the area of the search block 2A to encompass the areas of the search blocks 1A and 3A, and to produce the resulting correlation surface. In fact, the resulting correlation surfaces are produced directly by adding together the elements of the three correlation surfaces corresponding to the search blocks 1A, 2A and 3A. In effect, if each correlation surface is considered as a matrix of point magnitudes, then the correlation surface of the enlarged search block 2A is the matrix addition of the correlation surface of the original search blocks 1A, 2A and 3A.

The area of the search block 2A could also be grown vertically by adding correlation surfaces of the search blocks above and below, whilst if the search block 2A is to be grown both horizontally and vertically, then the four neighbouring diagonal correlation surfaces have to be added as well. From this it will be seen that the actual process of growing a search block to encompass neighbouring search blocks is relatively easy, the more difficult process being to decide when growing should take place, and which neighbouring search blocks should be encompassed. Basically, the answer is that the area of the search blocks should be grown until a good minimum or good motion vector is detected. It is therefore necessary to specify when a motion vector can be taken to be a good motion vector, and this can in fact be deduced from the examples given above.

In the example described with reference to FIGS. 13 to 16, it was necessary to grow the search block horizontally in order to encompass a unique horizontal feature of the object, and hence obtain a single minimum. This situation was characterized by a row of identical minima on the correlation surface of FIG. 15, and a single minimum on the correlation surface of FIG. 16. From this the first criteria for a good minimum can be obtained; a good minimum is the point of smallest magnitude on the correlation surface for which the difference between it and the magnitude of the next smallest point exceeds a given value. This given value is known as the threshold value, and hence this test is referred to herein as the threshold test.

It should be noted that the next smallest point is prevented from originating from within the bounds of a further test, described below, and referred to herein as the rings test. In the case of a rings test employing three rings, the next smallest point is prevented from originating from a point within three pixels of the point in question. In the example of FIGS. 13 to 16, the correlation surface of FIG. 15 would have failed the threshold test; the search area 2A is therefore grown and, given a suitable threshold value, the correlation surface of FIG. 16 will pass the threshold test.

The threshold test can also be used to cause growing in the example described above with reference to FIGS. 17 and 18. Prior to growing the search block, the correct minimum is undetectable, due to the closely similar magnitudes of the surrounding points. Given a suitable threshold value, however, the correlation surface will fail the threshold test, and the search block will be grown. As a result, it will then be possible to detect the minimum among the other spurious points.

It will be seen that the use of a threshold is a subjective test, but the correct threshold for the correlation surface under test can be selected by normalizing the threshold as a fraction of the range of magnitudes within the correlation surface. This also lessens the effect of, for example the contrast of the video source.

Figure 19:
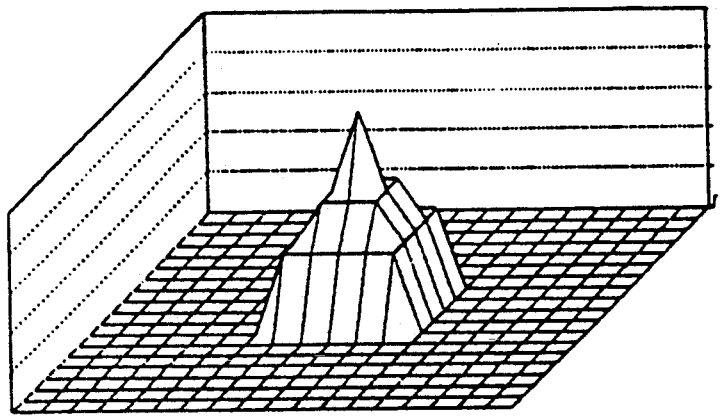
FIGS. 19 and 20 show still further examples of correlation surfaces, used in describing a rings test.
Figure 20:
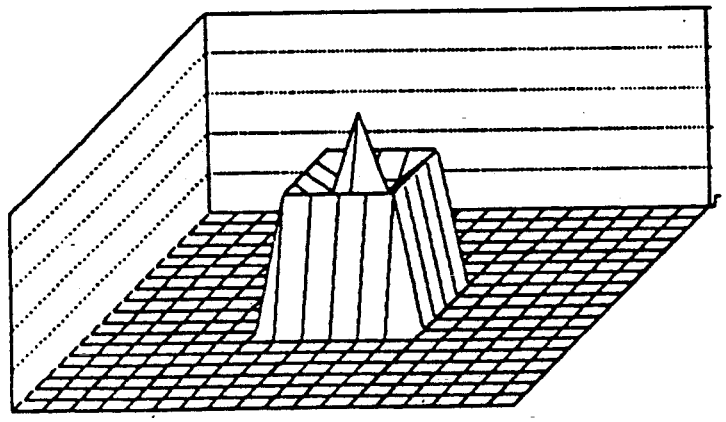

The rings test, referred to briefly above, and which is far less subjective, will now be further described. The basis of the rings test is to assume that a good minimum (or maximum) will have points of increasing (or decreasing) magnitudes surrounding it. FIG. 19 illustrates this assumption, showing a minimum at (0, 0) where the surrounding three rings of points have decreasing mean magnitude. This is as opposed to the correlation surface shown in FIG. 20, where the rings, and in particular the second inner-most ring, are not of decreasing mean magnitude.

In this case the criteria for a good minimum as defined by the rings test, is that the average slope is monotonic. Therefore for a predefined number of rings of points surrounding the minimum in question, the mean magnitude of each ring when moving from the inner-most ring outwards, must be greater than that of the previous ring. Returning again to the example described with reference to FIGS. 13 to 16, it will be seen from FIGS. 15 and 16 that the correlation surface of FIG. 15 would have failed the rings test, but that the correlation surface of FIG. 16 would have passed the rings test. Since the rings test compares mean, and not absolute, magnitudes, it is far less subjective than the threshold test, and indeed the only variable in the rings test is the number of rings considered.

Having described the mechanism for growing a search block, it is now necessary to consider how by examining the shape of the correlation surface it is possible to determine the most effective direction in which the search block should grow.

Referring again to FIG. 15, this correlation surface resulted where there was a unique vertical feature, but no unique horizontal feature. This is mirrored in the correlation surface by the minimum running horizontally across the correlation surface, due to the multiple correlations in this direction. From this it can be deduced that the search block should be grown horizontally. Conversely, should a line of multiple correlations run vertically, this would indicate the need to grow the search block vertically, whilst a circular collection of multiple correlations would indicate a need to grow the search block both horizontally and vertically.

Using this criteria, a quantative measure of the shape of the correlation surface is required in order to determine in which direction the search block should be grown. This measure is determined as follows. Firstly, a threshold is determined. Any point on the correlation surface below the threshold is then considered. This threshold, like that used in the threshold test, is normalized as a fraction of the range of magnitudes within the correlation surface. Using this threshold, the points on the correlation surface are examined in turn in four specific sequences. In each, the point at which the correlation surface value falls below the threshold is noted. These four sequences are illustrated diagrammatically in FIG. 21 in which the numbers 1, 2, 3 and 4 at the top, bottom, left and right refer to the four sequences, and the hatched area indicates points which fall below the threshold:

Sequence 1

Search from the top of the correlation surface down for a point A which falls below the threshold.

Sequence 2

Search from the bottom of the correlation surface up for a point C which falls below the threshold.

Sequence 3

Search from the left of the correlation surface to the right for a point D which falls below the threshold.

Sequence 4

Search from the right of the correlation surface to the left for a point B which falls below the threshold.

Figure 21:
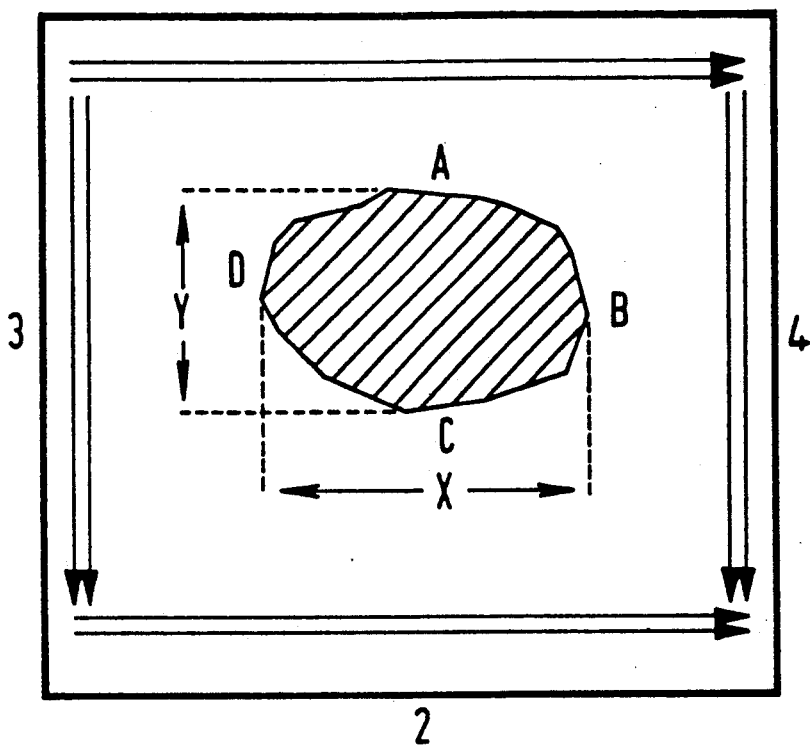
FIG. 21 shows diagrammatically how the direction in which a search block is to grow is determined.

The locations of the four resulting points A, B, C and D are used to calculate the two dimensions X and Y indicated in FIG. 21, these dimensions X and Y indicating the size of the hatched area containing the points falling below the threshold value. Hence from the dimensions X and Y, it can be deduced whether the shape is longer in the x rather than the y direction, or vice versa, or whether the shape is approximately circular. A marginal difference of say ten percent is allowed in deducing the shape, that is, the dimension X must be a minimum of ten percent greater than the dimension Y for the shape to be considered to be longer in the x direction. Similarly for the y direction. If the dimensions X and Y are within ten percent of each other, then the shape is considered to be circular, and the search block is grown in both directions. In the example of FIG. 21 the dimension X is greater than the dimension Y, and hence the search block is grown in the x or horizontal direction.

The growing of the search block continues until one or more growth limitations is reached. These limitations are: that the minimum in the correlation surface passes both the threshold test and the rings test; that the edge of the video frame is reached; or that the search block has already been grown a predetermined number of times horizontally and vertically. This last limitation is hardware dependent. That is to say, it is limited by the amount of processing that can be done in the available time. In one specific embodiment of apparatus according to the present invention, this limit was set at twice horizontally and once vertically.

If the minimum in the correlation surface passes both the threshold test and the rings test, then it is assumed that a good motion vector has been determined, and can be passed to the motion vector reducer 45 (FIG. 7). However, if the edge of the frame is reached or the search block has already been grown a predetermined number of times both horizontally and vertically, then it is assumed that a good motion vector has not been determined for that particular search block, and instead of attempting to determine a good motion vector, the best available motion vector is determined by weighting.

The correlation surface is weighted such that the selection of the best available motion vector is weighted towards the stationary, that is the centre, motion vector. This is for two reasons, firstly, if the search block, even after growing, is part of a large plain area of source video, it will not be possible to detect a good motion vector. However, since the source video is of a plain area, a stationary motion vector will lead to the correct results in the subsequent processing. Secondly, weighting is designed to reduce the possibility of a seriously wrong motion vector being passed to the motion vector reducer 45 (FIG. 7). This is done because it is assumed that when a good motion vector cannot be determined, a small incorrect motion vector is preferable to a large incorrect motion vector.

Figure 22:
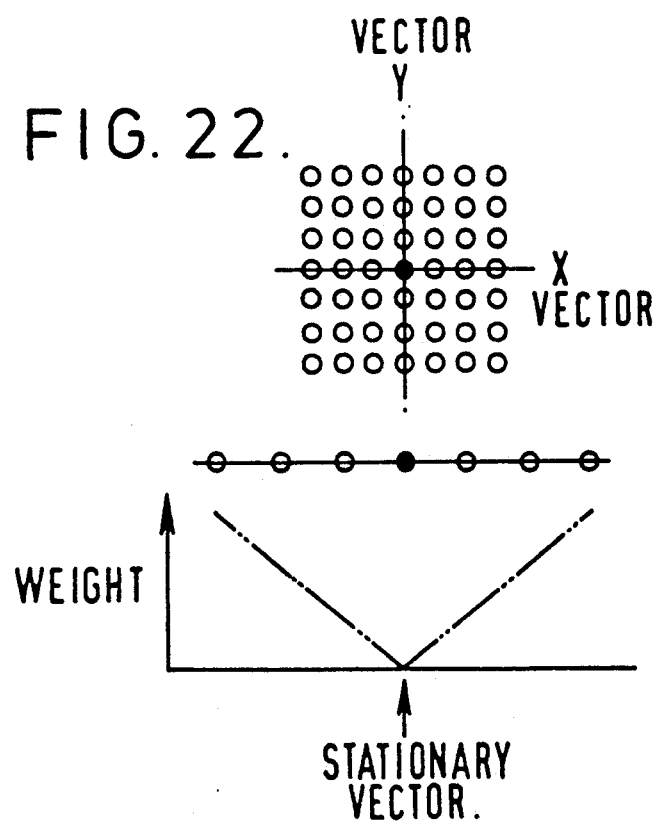
FIG. 22 shows diagrammatically how a correlation surface is weighted.

FIG. 22 shows an example of how the weighting function can be applied to the correlation surface. In this example, the weight applied to a given point on the correlation surface is directly proportional to the distance of that point from the stationary, centre motion vector. The magnitude of the point on the correlation surface is multiplied by the weighting factor. For example, the gradient of the weighting function may be such that points plus or minus 32 pixels from the centre, stationary motion vector are multiplied by a factor of three. In other words, as shown in FIG. 22, where the centre, stationary motion vector is indicated by the black circle, the weighting function is an inverted cone which is centred on the centre, stationary motion vector.

After the correlation surface has been weighted, it is again passed through the threshold test and the rings test. If a minimum which passes both these tests is determined, then it is assumed that this is a good motion vector, and it is flagged to indicate that it is a good motion vector, but that weighting was used. This flag is passed, together with the motion vector to the motion vector reducer 45 (FIG. 7). If on the other hand, neither a good motion vector nor a best available motion vector can be determined, even after weighting, then a flag is set to indicate that any motion vector passed to the motion vector reducer 45 (FIG. 7) for this search block is a bad motion vector. It is necessary to do this because bad motion vectors must not be used in the motion vector reduction process, but must be substituted as will be described below.

Thus, in summary, the operation of the motion vector estimator 44 (FIG. 7) is to derive from the correlation surface generated by the direct block matcher 43 (FIG. 7), the point of best correlation, that is the minimum. This minimum is then subjected to the threshold test and the rings test, both of which the minimum must pass in order for it to be considered to represent the motion of the search block. It should, incidentally, be noted that the threshold used in the threshold test and the rings test may be either absolute values or fractional values. If the minimum fails either test, then the search block is grown, a new minimum is determined, and the threshold test and the rings test re-applied. The most effective direction in which to grow the search block is determined from the shape of the correlation surface.

Referring initially to FIG. 7, the process of motion vector reduction will now be described. Using a HDVS, each search block is assumed to be 32 pixels by 23 lines, which can be shown to lead to a possible maximum of 2451 motion vectors. The choice of the search block size is a compromise between maintaining resolution and avoiding an excessive amount of hardware. If all these motion vectors were passed to the motion vector selector 46, the task of motion vector selection would not be practicable, due to the amount of processing that would be required. To overcome this problem, the motion vector reducer 45 is provided between the motion vector estimator 44 and the motion vector selector 46. The motion vector reducer 45 takes the motion vectors that have been generated by the motion vector estimator 44 and presents the motion vector selector 46 with only, for example, four motion vectors for each search block in the frame, including those in border regions, rather than all the motion vectors derived for that frame. The effect of this is two-fold. Firstly, this makes it much easier to choose the correct motion vector, so long as it is within the group of four motion vectors passed to the motion vector selector 46. Secondly, however, it also means that if the correct motion vector is not passed as one of the four, then the motion vector selector 46 is not able to select the correct one. It is therefore necessary to try to ensure that the motion vector reducer 45 includes the correct motion vector amongst those passed to the motion vector selector 46. It should also be mentioned that although four motion vectors are passed by the motion vector reducer 45 to the motion vector selector 46, only three of these actually represent motion, the fourth motion vector always being the stationary motion vector which is included to ensure that the motion vector selector 46 is not forced into applying a motion vector representing motion to a stationary pixel. Other numbers of motion vectors can be passed to the motion vector selector 46, for example, in an alternative embodiment four motion vectors representing motion and the stationary motion vector may be passed.

Hereinafter the term 'sample block' refers to a block in a frame of video in which each pixel is offered the same four motion vectors by the motion vector reducer 45. Thus, a sample block is the same as a search block before the search block has been grown, and in a frame of video the initial positions of the sample blocks and the search blocks are the same.

The motion vector reducer 45 (FIG. 7) receives the motion vectors and the flags from the motion vector estimator 44 (FIG. 7) and determines the quality of the motion vectors by examining the flags. If the motion vector was not derived from an ambiguous surface, that is there is a high degree of confidence in it, then it is termed a good motion vector, but if a certain amount of ambiguity exists, then the motion vector is termed a bad motion vector. In the motion vector reduction process, all motion vectors classed as bad motion vectors are ignored, because it is important that no incorrect motion vectors are ever passed to the motion vector selector 46 (FIG. 7), in case a bad motion vector is selected thereby. Such selection would generally result in a spurious dot in the final picture, which would be highly visible.

Each of the motion vectors supplied to the motion vector reducer 45 (FIG. 7) was obtained from a particular search block, and hence a particular sample block, the position of these being noted together with the motion vector. Because any motion vectors which have been classed as bad motion vectors are ignored, not all sample blocks will have a motion vector derived from the search block at that position. The motion vectors which have been classed as good motion vectors, and which relate to a particular search block, and hence a particular sample block, are called local motion vectors, because they have been derived in the area from which the sample block was obtained. In addition to this, another motion vector reduction process counts the frequency at which each good motion vector occurs, with no account taken of the actual positions of the search blocks that were used to derive them. These motion vectors are then ranked in order of decreasing frequency, and are called common motion vectors. In the worst case only three common motion vectors are available and these are combined with the stationary motion vector to make up the four motion vectors to be passed to the motion vector selector 46 (FIG. 7). However, as there are often more than three common motion vectors, the number has to be reduced to form a reduced set of common motion vectors referred to as global motion vectors.

A simple way of reducing the number of common motion vectors is to use the three most frequent common motion vectors and disregard the remainder. However, the three most frequent common motion vectors are often those three motion vectors which were initially within plus or minus one pixel motion of each other vertically and/or horizontally. In other words, these common motion vectors were all tracking the same motion with slight differences between them, and the other common motion vectors, which would have been disregarded, were actually tracking different motions.

In order to select the common motion vectors which represent all or most of the motion in a scene, it is necessary to avoid choosing global motion vectors which represent the same motion. Thus, the strategy actually adopted is first to take the three most frequently occurring common motion vectors and check to see if the least frequent among them is within plus or minus one pixel motion vertically and/or plus or minus one pixel motion horizontally of either of the other two common motion vectors. If it is, then it is rejected, and the next most frequently occurring common motion vector is chosen to replace it. This process is continued for all of the most frequently occurring common motion vectors until there are either three common motion vectors which are not similar to each other, or until there are three or less common motion vectors left. However, if there are more than three common motion vectors left, then the process is repeated this time checking to see if the least frequent among them is within plus or minus two pixel motion vertically and/or plus or minus two pixel motion horizontally of another, and so on at increasing distances if necessary. These three common motion vectors are the required global motion vectors, and it is important to note that they are still ranked in order of frequency.

Figures 23, 24:
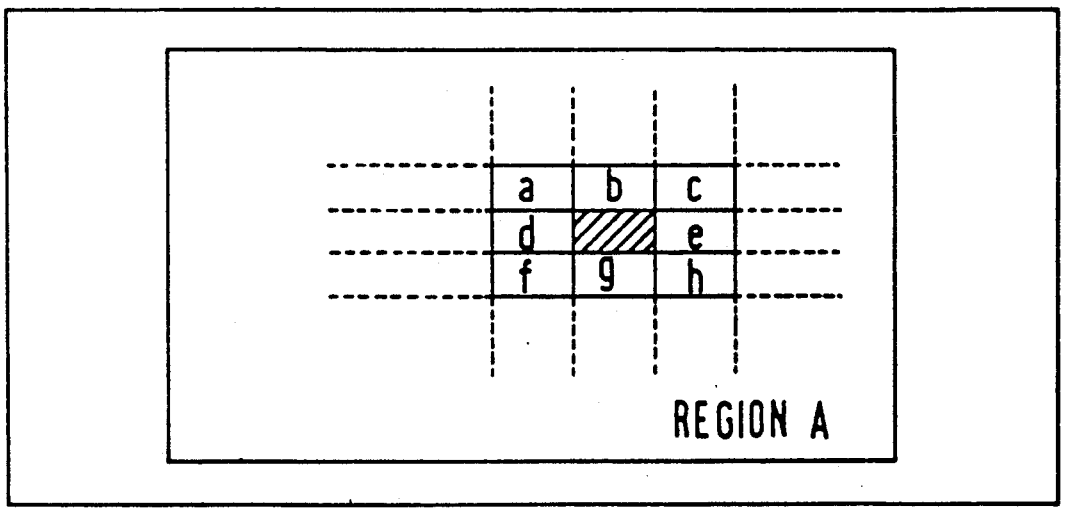
FIG. 23 shows motion vector regions in a frame of video.
FIGS. 24 to 26 show diagrams used in explaining motion vector reduction in respective regions of a frame of video.

When considering the motion vector reduction process and the sample blocks of a frame of video, it is necessary to look at three different types of sample blocks. These types are related to their actual position in a frame of video, and are shown in FIG. 23 as regions. Region A comprises sample blocks which are totally surrounded by other sample blocks and are not near the picture boundary. Region B contains sample blocks which are partially surrounded by other sample blocks and are not near the picture boundary. Finally, region C contains sample blocks which are near the picture boundary. The motion vector reduction algorithm to be used for each of these regions is different. These algorithms will be described below, but firstly it should be reiterated that there exist good motion vectors for some of the sample blocks in the frame of video, and additionally there are also three global motion vectors which should represent most of the predominant motion in the scene. A selection of these motion vectors is used to pass on three motion vectors together with the stationary motion vector for each sample block.

FIG. 24 illustrates diagrammatically motion vector reduction in the region A. This is the most complex region to deal with, because it has the largest number of motion vectors to check. FIG. 24 shows a central sample block which is hatched, surrounded by other sample blocks a to h. Firstly, the locally derived motion vector is examined to see if it was classed as a good motion vector. If it was, and it is also not the same as the stationary motion vector, then it is passed on. However, if it fails either of these tests, it is ignored. Then the motion vector associated with the sample block d is checked to see if it was classed as a good motion vector. If it was, and if it is neither the same as any motion vector already selected, nor the same as the stationary motion vector, then it too is passed on. If it fails any of these tests then it too is ignored. This process then continues in a similar manner in the order e, b, g, a, h, c and f. As soon as three motion vectors, not including the stationary motion vector, have been obtained, then the algorithm stops, because that is all that is required for motion vector selection for that sample block. It is, however, possible for all the above checks to be carried out without three good motion vectors having been obtained. If this is the case, then the remaining spaces are filled with the global motion vectors, with priority being given to the more frequent global motion vectors.

Figure 25:
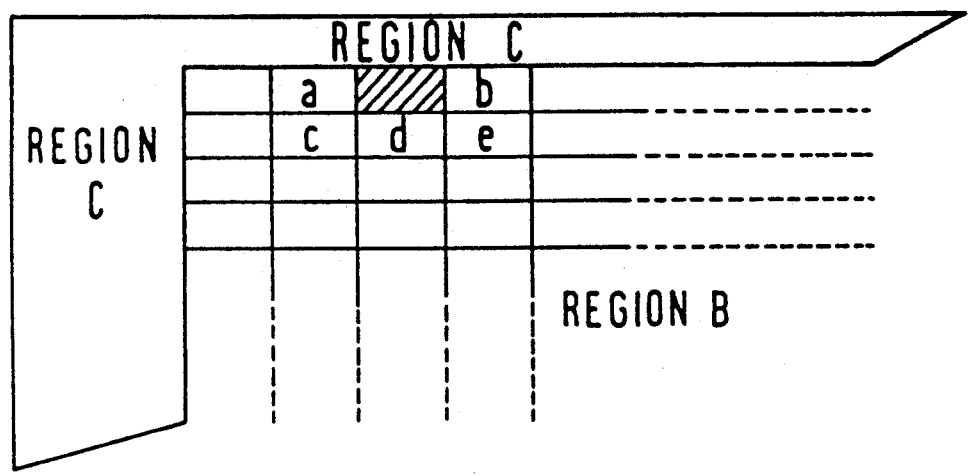

FIG. 25 illustrates motion vector reduction in the region B. Sample blocks in the region B are the same as those in the region A, except that they are not totally surrounded by other sample blocks. Thus the process applied to these sample blocks is exactly the same as those for the region A, except that it is not possible to search in all the surrounding sample blocks. Thus as seen in FIG. 25, it is only possible to check the motion vectors for the sample blocks a to e, and any remaining spaces for motion vectors are filled, as before, with global motion vectors. Likewise, if the hatched sample block in FIG. 34 were displaced two positions to the left, then it will be seen that there would only be three adjacent surrounding blocks to be checked before resorting to global motion vectors.

Figure 26:
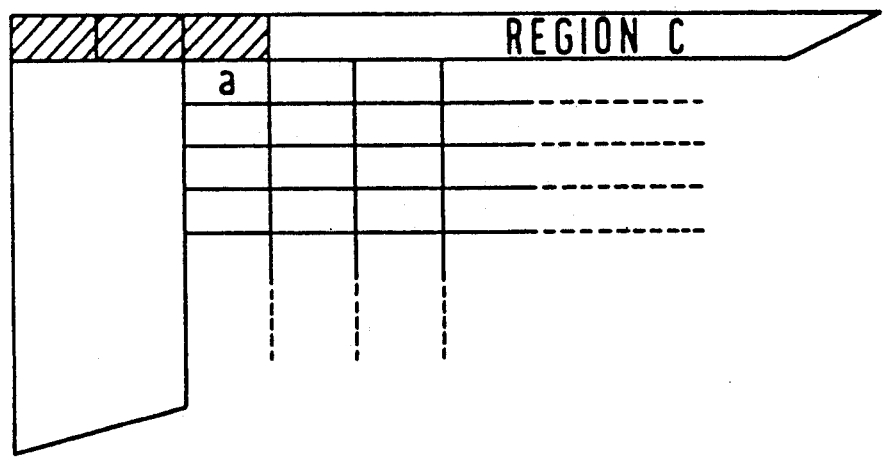

FIG. 26 illustrates motion vector reduction in the region C. This is the most severe case, because the sample blocks neither have a locally derived motion vector nor do they have many surrounding sample blocks whose motion vectors could be used. The simplest way of dealing with this problem is simply to give the sample blocks in the region C the global motion vectors together with the stationary motion vector. However, this is found to produce a block-like effect in the resulting picture, due to the sudden change in the motion vectors presented for the sample blocks in the region C compared with adjoining sample blocks in the region B. Therefore a preferred strategy is to use for the sample blocks in the region C the sample motion vectors as those used for sample blocks in the region B, as this prevents sudden changes. Preferably, each sample block in the region C is assigned the same motion vectors as that sample block in the region B which is physically nearest to it. Thus, in the example of FIG. 26, each of the hatched sample blocks in the region C would be assigned the same motion vectors as the sample block a in the region B, and this has been found to give excellent results.

Referring again to FIG. 7, the purpose of the motion vector selector 46 is to assign one of the four motion vectors supplied thereto to each individual pixel within the sample block. In this way the motion vectors can be correctly mapped to the outline of objects. The way in which this assignment is effected is particularly intended to avoid the possibility of the background surrounding fine detail from producing a better match than that produced by the correct motion vector. To achieve this the motion vector selection process is split into two main stages. In the first stage, motion vectors are produced for each pixel in the input frames. In other words, there is no attempt to determine the motion vector values for pixels at the output frame positions. The second stage uses the motion vector values produced by the first stage to determine the motion vector value for each pixel in the output frame.

Figure 27:
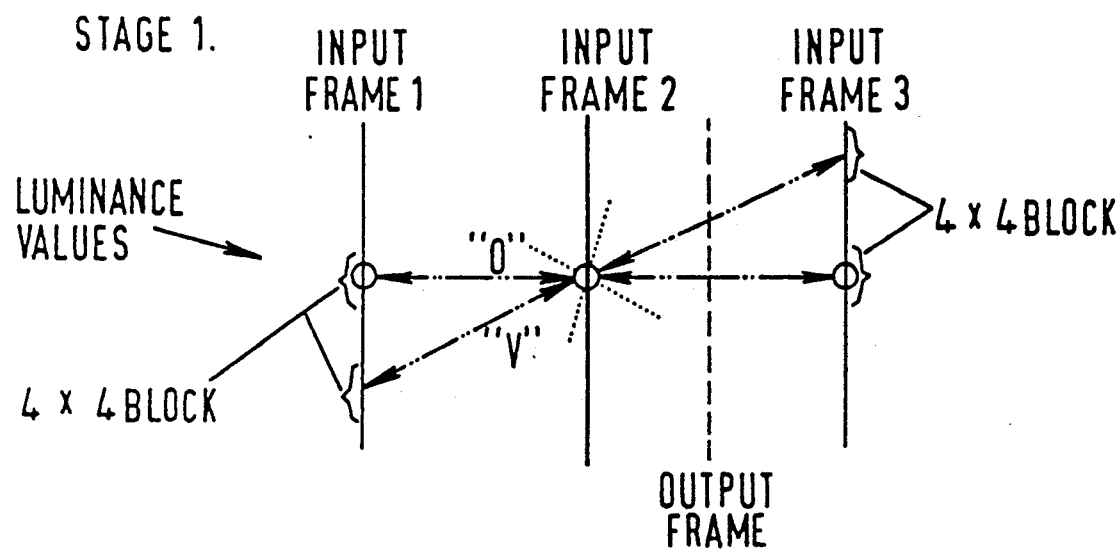
FIGS. 27 and 28 show diagrammatically a first stage in motion vector selection.

Referring now to FIG. 27, each pixel of the input frame 2 is tested for the best luminance value match with the previous and following input frames 1 and 3 of video data, using each of the four motion vectors supplied. The pixel luminance difference is determined as:

$$\sum_{m=0}^{4} \sum_{n=0}^{4} |P1_{nm} - P2_{nm}| + \sum_{m=0}^{4} \sum_{n=0}^{4} |P2_{nm} - P3_{nm}|$$

where:
$P1_{nm}$ is the luminance value of a frame 1 pixel within a 4×4 block of pixels surrounding the pixel whose location is obtained by subtracting the coordinates of the motion vector being tested from the location of the pixel being tested in frame 2

$P2_{nm}$ is the luminance value of a frame 2 pixel within a 4×4 block of pixels surrounding the pixel being tested $P3_{nm}$ is the luminance value of a frame 3 pixel within a 4×4 block of pixels surrounding the pixel whose location is obtained by adding the coordinates of the motion vector being tested to the location of the pixel being tested in frame 2

The minimum pixel difference then indicates the best luminance match and therefore the correct motion vector applicable to the pixel being tested. If the correct motion vector is not available, or there are uncovered or covered areas or a scene discontinuity, referred to in more detail below, then a good match may not occur.

The indication of a poor match is achieved when the average pixel difference within the block of pixels being used is above a certain threshold. This threshold is important, because high frequency detail may produce a poor match even when the correct motion vector is tested. The reason for this poor match is the possibility of a half pixel error in the motion vector estimate. To determine what threshold should indicate a poor match, it is necessary to relate the threshold to the frequency content of the picture within the block of data which surrounds the pixel for which the motion vector is required. To achieve this, an auto-threshold value is determined where the threshold value equals half the maximum horizontal or vertical pixel luminance difference about the pixel being tested. To ensure that the threshold value obtained is representative of the whole block of data which is compared, an average value is obtained for the four central pixels of a 4×4 block used.

Figure 28:
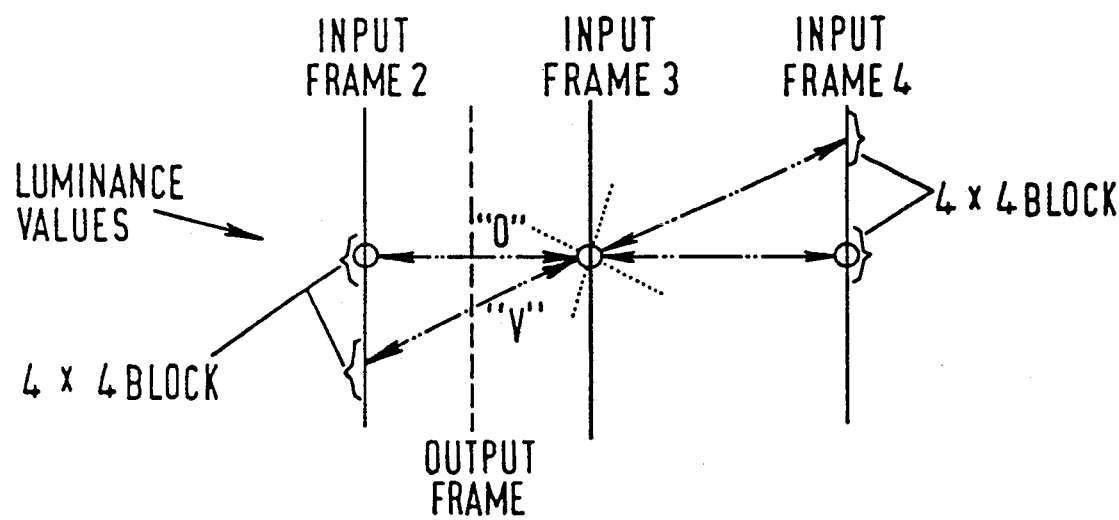
Figure 29:
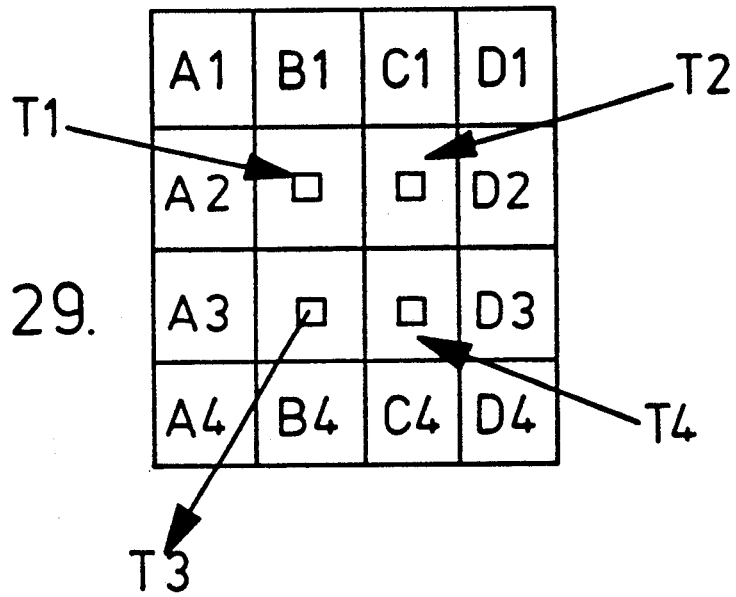
FIGS. 29 and 30 show diagrammatically how a threshold is established during the motion vector selection.
Figure 30:
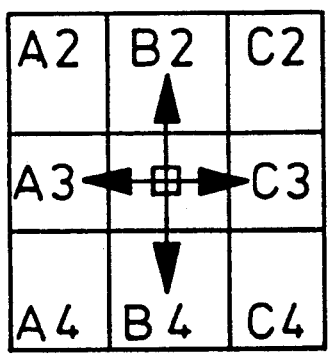

Referring to FIG. 29, which shows a 4×4 block, the required threshold value T is given by:

$$T = (T1 + T2 + T3 + T4)/8$$

where T3, for example, is determined as indicated in FIG. 30 as equal to the maximum of the four pixel luminance difference values comprising:

the two vertical differences $|B2-B3|$ and $|B4-B3|$, and the two horizontal differences $|A3-B3|$ and $|C3-B3|$ In this way a frame of motion vectors is obtained for input frame 2, and in a similar manner a frame of motion vectors is obtained for input frame 3 as indicated in FIG. 28.

Apart from scene changes, it is the phenomenon of uncovered/covered surfaces that causes a mis-match to occur in the above first stage of motion vector selection. If an object, say a car, drives into a tunnel, then the car has become covered, while when it drives out, the car is uncovered. If the part of the car that was uncovered in frames 1 and 2 is covered in frames 3 and 4, then the basic vector selection process is not able to determine the correct vector. Moreover, whilst the car going into the tunnel becomes covered, the road and objects behind the car are being uncovered. Likewise the car leaving the tunnel is being uncovered, but the road and objects behind the car are being covered. In general therefore both covered and uncovered objects will exist at the same time. The end of a scene will also have a discontinuation of motion that is similar to an object becoming covered. In an attempt to determine a motion vector even in such circumstances, the luminance value block match is reduced to a two frame match, instead of the three frame match of FIGS. 27 and 28. The frame that the motion vectors are required for (say frame 2) is block-matched individually to the previous and the next frame (frame 1 and frame 3 respectively, in the case of frame 2), using the four motion vectors supplied. The motion vector which produces the best match is chosen as the motion vector applicable to the pixel being tested. In this case, however, a flag is set to indicate that only a two frame match was used.

Particularly with integrating type television cameras, there will be situations where no match occurs. If an object moves over a detailed background, then an integrating camera will produce unique portions of picture where the leading and trailing edges of the object are mixed with the detail of the background. In such circumstances, even the two frame match could produce an average pixel difference above the threshold value. In these cases the motion vector value is set to zero, and an error flag is also set.

Figure 31:
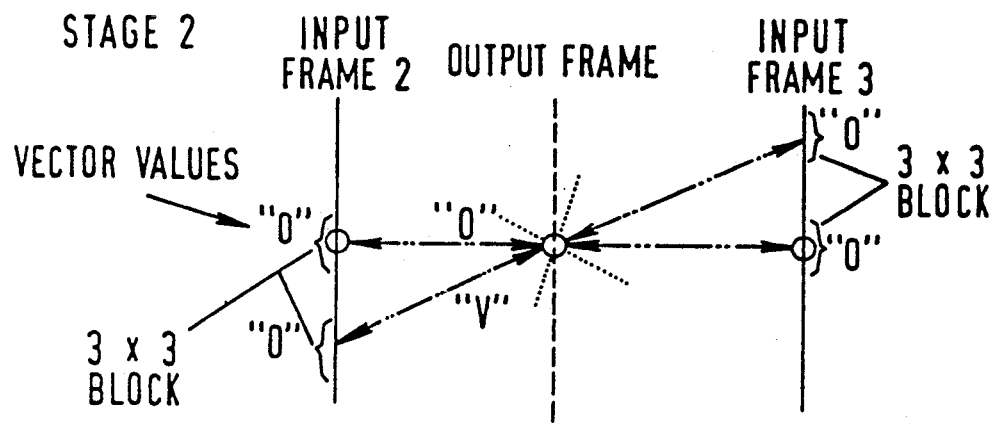
FIG. 31 shows diagrammatically a second stage in motion vector selection.

The second stage of motion vector selection makes use of the two frames of motion vectors, derived by the first stage. One frame of motion vectors (input frame 2) is considered to be the reference frame, and the following frame to this (input frame 3) is also used. The output frame position then exists somewhere between these two frames of motion vectors. Referring to FIG. 31, for each output pixel position the four possible motion vectors associated with the sample block of input frame 2, are tested. A line drawn through the output pixel position at the angle of the motion vector being tested will point to a position on both the input frame 2 and the input frame 3. In the case of odd value motion vectors, for example, 1, 3 and 5, a point midway between two input frame pixels would be indicated in the case where the output frame is precisely half way between the input frames 1 and 2. To allow for this inaccuracy, and also to reduce the sensitivity to individual pixels, a 3×3 block of motion vectors is acquired for each frame, centred on the closest pixel position. In effect a block-match is then performed between each of the two 3×3 blocks of motion vectors and a block containing the motion vector being tested. The motion vector difference used represents the spatial difference of the two motion vector values as given by:

$$\sqrt{((x1-x2)^2 + (y1-y2)^2)}$$

where:
x1 and y1 are the Cartesian coordinates of the motion vector in one of the blocks
x2 and y2 are the Cartesian coordinates of the motion vector being tested An average vector difference per pixel is produced as a result of the block match.

A motion vector match is first produced as above using only motion vector values which were calculated using three input frames; that is, input frames 1, 2 and 3 for input frame 2 (FIG. 27), and input frames 2, 3 and 4 for input frame 3 (FIG. 28), and the result is scaled accordingly. Preferably there are at least four usable motion vectors in the block of nine. When both the motion vector block of frame 2 and frame 3 can be used, the motion vector difference values are made up of half the motion vector difference value from frame 2 plus half the motion vector difference value from frame 3. Whichever motion vector produces the minimum motion vector difference value using the above technique is considered to be the motion vector applicable to the output pixel being tested. If the motion vector difference value produced by the three frame match input motion vector (FIGS. 27 and 28 is greater than unity, then a covered or uncovered surface has been detected, and the same process is repeated, but this time ignoring the error flags. That is, the motion vector values which were calculated using two input frames are used. Theoretically this is only necessary for uncovered/covered surfaces, although in fact improvements can be obtained to the picture in more general areas.

If after both of the above tests have been performed, the minimum motion vector match is greater than two, the motion vector value is set to zero, and an error flag is set for use by the motion vector post processor 47 (FIG. 7).

Following motion vector selection, there will almost certainly be in any real picture situation, some remaining spurious motion vectors associated with certain pixels. Such spurious motion vectors are assumed to exist at a point singularity, where a single pixel has a motion vector different from those of all the surrounding pixels; at a horizontal motion vector impulse, where three horizontally aligned pixels have a motion vector different from those of the surrounding pixels; at a vertical motion vector impulse, where three vertically aligned pixels have a motion vector different from those of the surrounding pixels; at a diagonal motion vector impulse, where three diagonally aligned pixels have a motion vector different from those of all the surrounding pixels; at a horizontal plus vertical motion vector impulse, where five pixels disposed in an upright cross have a motion vector different from those of all the surrounding pixels; and at a two-diagonal motion vector impulse where five pixels arranged in a diagonal cross have a motion vector different from those of all the surrounding pixels.

It is assumed that pixel motion vectors which fall into any of the above six categories do not actually belong to a real picture, and are a direct result in of an incorrect motion vector selection, if such motion vectors were used during the interpolation process, then they would be likely to cause dots on the final output picture, and it is therefore preferable that such motion vectors be identified and eliminated. This is done using an algorithm which will detect and flag all of the above motion vector groupings.

Having identified the bad motion vectors, it is then necessary to repair them, this also being effected by the motion vector post processor 47 (FIG. 7). Although various methods such as interpolation or majority replacement can be used, it is has been found that in practice simple replacement gives good results.

Figure 32:
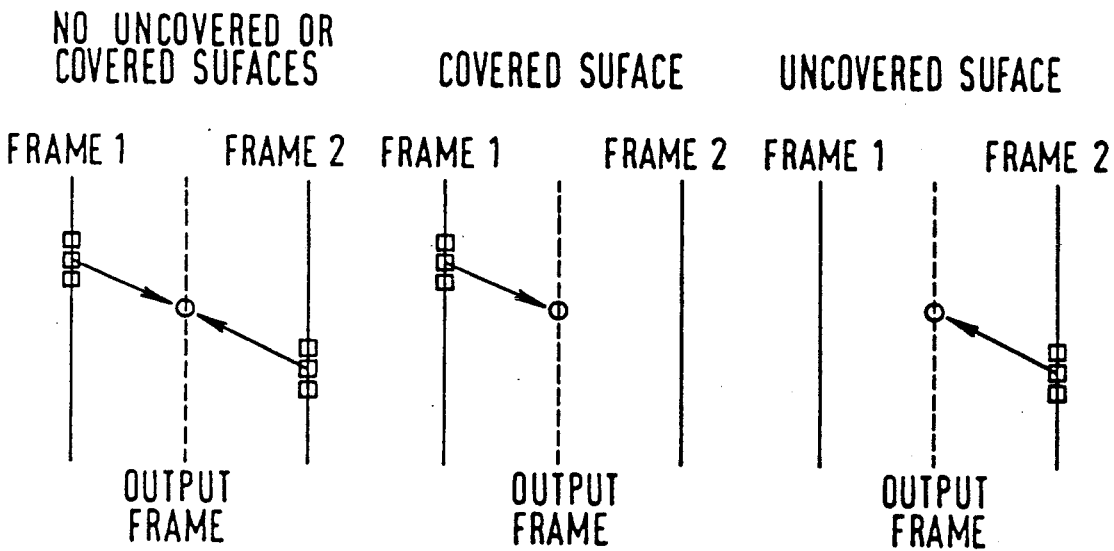
FIG. 32 shows diagrammatically the operation of an interpolator.

Referring again to FIG. 7, the finally selected motion vector for each pixel is supplied by the motion vector post processor 47 to the interpolator 48, together with the progressive scan converted frames at 60 frames per second from the progressive scan converter 42. The interpolator 48 is of relatively simple form using only two progressive scan converted frames, as indicated in FIG. 32. Using the temporal position of the output frame relative to successive input frames, frame 1 and frame 2, and the motion vector for the pixel in the output frame, the interpolator 48 determines in known manner which part of the first frame should be combined with which part of the second frame and with what weighting to produce the correct output pixel value. In other words, the interpolator 48 adaptively interpolates along the direction of movement in dependence on the motion vectors to produce motion compensated progressive scan frames corresponding to 24 frames per second. Although the motion vectors have been derived using only luminance values of the pixels, the same motion vectors are used for deriving the required output pixel chrominance values. An 8×8 array of pixels are used from each frame to produce the required output. Thus the interpolator 48 is a two-dimensional, vertical/horizontal, interpolator and the coefficients used for the interpolator 48 may be derived using the Remez exchange algorithm which can be found fully explained in 'Theory and application of digital signal processing', Lawrence R Rabiner, Bernard Gold. Prentice-Hall Inc., pages 136 to 140 and 227.

FIG. 32 shows diagrammatically the interpolation performed by the interpolator 48 (FIG. 7) for three different cases. The first case, shown on the left, is where there are no uncovered or covered surfaces, the second case, shown in the centre, is where there is a covered surface, and the third case, shown on the right, is where there is an uncovered surface. In the case of a covered surface, the interpolation uses only frame 1, whilst in the case of an uncovered surface, the interpolation uses only frame 2.

Provision can be made in the interpolator 48 to default to nonmotion compensated interpolation, in which case the temporally nearest progressive scan converted frame is used.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of controlling tape speed of a video tape recorder so as to reproduce a recorded video signal comprises of a plurality of fields and frames at a predetermined playback speed having a corresponding field repetition frequency and which may differ from a normal playback speed corresponding to the speed at which said video signal was recorded, said method comprising the steps of:

counting incrementally so as to produce a first series and a second series of respective counted values by using a signal having a frequency which is locked to the field repetition frequency of said video signal at said normal playback speed;

restarting said counting of said first series at periodic intervals determined by said predetermined playback speed;

restarting said counting of said second series periodically in accordance with a signal having a frequency which is locked to the field repetition frequency of said video signal being reproduced by said video tape recorder;

comparing said first and second series so as to derive an error signal therefrom; and controlling said tape speed of said video tape recorder in accordance with said error signal.

2. A method according to claim 1, wherein said predetermined playback speed is substantially equivalent to 1/n of said normal playback speed, where n is an integer greater than or equal to two, and wherein said first series is counted in modulo-2n and is reset to zero at every 2nth counted value, and said second series is reset at every 2nth field of said video signal being reproduced by said video tape recorder.

3. A method according to claim 2, further comprising the steps of supplying a first output signal when the respective counted value of said first series has a first predetermined value which lies in a range of 0 to n−1 and a second output signal when the respective counted value of said first series has a second predetermined value which lies in the range of n to 2n−1, and grabbing the field of said video signal which is being reproduced by said video tape recorder in response to each said first and second output signal.

4. A method according to claim 3, wherein each said first and second output signal is supplied to a television standards converter.

5. A method according to claim 3, wherein said n has a value of eight.

6. A method according to claim 1, wherein said predetermined playback speed is substantially equivalent to 1/n of said normal playback speed, where n is an integer greater than or equal to two, and wherein said first series is counted in modulo-n and is reset to zero at every nth counted value, and said second series is reset at every nth frame of said video signal being reproduced by said video tape recorder.

7. A method according to claim 6, further comprising the steps of supplying a first output signal when the respective counted value of said first series has a predetermined value which lies in a range of 0 to n−1, and grabbing the frame of said video signal which is being reproduced by said video tape recorder in response to each said first output signal.

8. A method according to claim 7, wherein each said first output signal is supplied to a television standards converter.

9. A method according to claim 7, wherein said n has a value of eight.

10. Video tape recorder speed control apparatus for controlling tape speed of a video tape recorder so as to reproduce a recorded video signal comprised of a plurality of fields and frames at a predetermined playback speed having a corresponding field repetition frequency and which may differ from a normal playback speed corresponding to the speed at which said video signal was recorded, said apparatus comprising:

first and second counter means incremented by utilizing a signal having a frequency which is locked to the field repetition frequency of said video signal at said normal playback speed for generating respective counted values, said first counter means being periodically reset at intervals determined by said predetermined playback speed;

means for resetting said second counter means by use of a signal having a frequency which is locked to the field repetition frequency of said video signal being reproduced by said video tape recorder;

comparator means for periodically comparing the respective counted values of said first and second counter means so as to derive an error signal therefrom; and means for controlling said tape speed of said video tape recorder in accordance with said error signal.

11. Apparatus according to claim 10, wherein said comparator means compares the respective counted values of said first and second counter means each time said second counter means is reset.

12. Apparatus according to claim 10, wherein said predetermined playback speed is substantially equivalent to 1/n of said normal playback speed, where n is an integer greater than or equal to two, and wherein said first counter means includes a modulo-2n counter which resets to zero at every 2nth counted value, and said second counter means is reset at every 2nth field of said video signal being reproduced by said video tape recorder.

13. Apparatus according to claim 12, wherein said first counter means supplied a first output signal when the respective counted value has a first predetermined value which lies in a range of 0 to n−1, and supplied a second output signal when the respective counted value has a second predetermined value which lies in the range of n to 2n−1; and wherein said apparatus further comprises means for receiving each said first and second output signal and, in response thereto, for grabbing the field of said video signal which is being reproduced by said video tape recorder.

14. Apparatus according to claim 13, wherein said means for receiving and grabbing includes a television standards converter.

15. Apparatus according to claim 13, wherein said n has a value of eight.

16. Apparatus according to claim 10, wherein said predetermined playback speed is substantially equivalent to 1/n of said normal playback speed, where n is an integer greater than or equal to two, and wherein said first counter means includes a modulo-n counter which resets to zero at every nth counted value, and said second counter means is reset at every nth frame of said video signal being reproduced by said video tape recorder.

17. Apparatus according to claim 16, wherein said first counter means supplies a first output signal when the respective counted value has a predetermined value which lies in a range of 0 to n−1; and wherein said apparatus further comprises means for receiving each said first output signal and, in response thereto, for grabbing the frame of said video signal which is being reproduced by said video tape recorder.

18. Apparatus according to claim 17, wherein said means for receiving and grabbing includes a television standards converter.

19. Apparatus according to claim 17, wherein said n has a value of eight.

20. Apparatus according to claim 10, wherein said means for controlling includes low-pass filter means for receiving said error signal and, in accordance therewith, for deriving a control signal for controlling said predetermined playback speed of said video tape recorder.

21. Apparatus according to claim 20, wherein said low-pass filter means includes limiter means for limiting said control signal to a maximum predetermined value.

22. Video tape recorder speed control apparatus for controlling tape speed of a video tape recorder so as to reproduce a recorded video signal comprised of a plurality of fields at a predetermined playback speed having a corresponding field repetition frequency, in which each of said fields includes a plurality of lines occurring at a predetermined frequency, said apparatus comprising:

counter means incremented by utilizing a signal having a frequency which is locked to the line frequency of said video signal for generating counted values and for supplying a signal corresponding thereto;

means for resetting said counter means by use of a signal having a frequency which is locked to the field repetition frequency of said video signal being reproduced by said video tape recorder;

means for deriving an error signal from said signal having said field repetition frequency and the signal supplied from said counter means; and means for controlling said tape speed of said video tape recorder in accordance with said error signal.

* * * * *